United States Patent
Okajima et al.

(10) Patent No.: US 6,536,849 B1
(45) Date of Patent: *Mar. 25, 2003

(54) BICYCLE WHEEL

(75) Inventors: Shinpei Okajima, Izumi (JP); Tsutomu Muraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/715,182

(22) Filed: Nov. 20, 2000

(51) Int. Cl.⁷ .............................................. B60B 21/06
(52) U.S. Cl. ................ 301/58; 301/95.104; 301/95.107
(58) Field of Search ........................ 301/58, 61, 95.101, 301/95.104, 95.105, 95.106, 95.107, 104, 110.5

(56) References Cited

U.S. PATENT DOCUMENTS

| | | | |
|---|---|---|---|
| 502,500 A | * | 8/1893 | Perkins |
| 2,778,690 A | * | 1/1957 | Horling, Jr. |
| 2,937,905 A | * | 5/1960 | Altenburger ........... 301/95.104 |
| 3,008,770 A | | 11/1961 | Mueller ........................ 301/97 |
| 5,445,439 A | | 8/1995 | Dietrich ........................ 301/55 |
| 5,452,945 A | | 9/1995 | Schlanger .................... 301/58 |
| 5,651,591 A | * | 7/1997 | Mercat et al. ......... 301/95.106 |
| 5,769,584 A | * | 6/1998 | Claes |
| 5,882,088 A | | 3/1999 | Yahata .................... 301/110.5 |
| 6,048,035 A | * | 4/2000 | Chen |
| 6,068,348 A | | 5/2000 | Okajima et al. .............. 301/58 |
| 6,126,243 A | | 10/2000 | Okajima et al. .............. 301/58 |

\* cited by examiner

*Primary Examiner*—Russell D. Stormer
(74) *Attorney, Agent, or Firm*—Shinjyu Global IP Counselors, LLP

(57) ABSTRACT

A bicycle wheel basically has a hub, a plurality of spokes extending outwardly from the hub and an annular rim coupled to the outer ends of the spokes for supporting a tire. The annular rim has a spoke attachment portion with a plurality of spoke openings for receiving the outer ends of the spokes therein. The spoke openings of the annular rim have reinforcement members located between the spokes and annular rim. The outer ends of the spokes have bent sections located within the spoke holes of the reinforcement members or washers and head section that engage the inner surface of the reinforcement members. The rim is free of access apertures or holes in the outer annular portion adjacent a majority of the spoke holes. The reinforcement member has a transverse dimension allowing the outer end of the spoke and the reinforcement member to pass through the openings in a first orientation and be retained in the openings in a second orientation.

45 Claims, 18 Drawing Sheets

BICYCLE WHEEL

CROSS-REFERENCE TO RELATED APPLICATIONS

This invention is related to U.S. patent application Ser. No. 09/222,084, filed Dec. 29, 1998, now U.S. Pat. No. 6,126,243, assigned to Shimano, Inc.

BACKGROUND THE INVENTION

1. Field of the Invention

This invention generally relates to a bicycle wheel with a hub adapted to be mounted to a bicycle frame, an annular rim and a plurality of spokes extending inwardly from the rim to the hub. More specifically, the present invention relates to the connection between the spokes and the rim of the bicycle wheel.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. The most basic bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

With a spoke constructed in this manner, the nipples are installed in nipple holes formed in either the rim or the hub. The spokes are inserted through holes in either the hub flange or the rim with the flanges of the spokes engaging the areas surrounding the holes in either the hub flange or the rim. The male threads on the ends of the spokes are threaded into the female threads of the spoke nipples installed in the openings of the hub flange or the rim. It is desirable in the bicycle industry to have as few spokes as possible. One problem with conventional spokes is the concentrated stress applied to the rim. Moreover, if fewer spokes are used, the stress on the rim becomes increasingly larger. Typically, conventional spokes are attached to either the inner edge or the lateral side portions of the rim. Thus, the amount of force that can be applied to the rim by the spokes depends mainly upon the thickness of the inner edge of the rim or the lateral side portions of a rim. In order to accommodate the stress from the spokes, the inner edge of the rim can be made thicker. However, making the rim thicker increases the weight of the rim. Moreover, conventional spokes are not very aerodynamic in design.

In recent years, wheels have been designed with reinforcing members arranged on the outer ends of the spokes to aid in disbursing the stress concentrated on portions of the rim. Such a wheel is disclosed in Shimano's U.S. Pat. No. 6,126,243. This wheel (i.e., rim, and spoke combination) is very strong, lightweight, and relatively simple and inexpensive to manufacture. However, this design requires drilling a plurality of access holes in the outer peripheral surface of the rim. The spokes and reinforcement members are inserted through these holes into spoke openings of the rim during assembly. These holes then have to be sealed and a tubed tire installed. If a spoke needs to be replaced, the tire, tube and seal have to be removed from the rim so the spoke can be replaced.

In view of the above, there exists a need for a bicycle wheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle wheel with a lightweight rim that is relatively durable without adding any thickness to the spoke receiving portion of the rim.

Another object of the present invention is to provide a bicycle wheel, in which a plurality of holes in the outer peripheral surface of the rim can be eliminated such that a tubeless or a tubed tire can be utilized.

Another object of the present invention is to provide a bicycle wheel with fewer spokes extending between the rim and the hub.

Another object of the present invention is to provide a bicycle wheel, which can be relatively simple and inexpensive to manufacture by conventional manufacturing techniques.

Still another object of the present invention is to provide a bicycle wheel in which the tire does not have to be removed to replace a spoke.

Still another object of the present invention is to provide a bicycle wheel in which a tubeless tire can be used and spokes can be replaced without removing the tire.

The foregoing objects can basically be attained by providing a spoke and rim assembly, comprising an annular rim having a hollow interior formed by an outer annular portion adapted to receive a tire thereon, first and second annular spoke attachment portions extending from the outer annular portion and located radially inwardly of the outer annular portion and an inner annular portion located radially inwardly of the first and second annular spoke attachment portions and extending between the first and second annular spoke attachment portions. The first and second annular spoke attachment portions face in substantially opposite directions with a plurality of circumferentially arranged spoke openings formed therein. The spoke and rim assembly includes a plurality of inwardly extending spokes with each of the spokes having an outer end portion at least partially received within one of the spoke openings. Each of the spokes has a center portion located radially inwardly of the outer end portion, and an inner end portion located radially inwardly of the center portion. The spoke and rim assembly also includes a plurality of reinforcement members with each of the reinforcement members being at least partially located in the spoke openings and coupled to one of the outer portions of the spokes. The reinforcement members have first and second transverse dimensions that are so dimensioned relative to the spoke openings such that the reinforcement members with the outer portions of the spokes coupled thereto pass through the spoke openings in a first relative orientation between the reinforcement members and the spoke openings, and are retained within the spoke openings in a second relative orientation between the reinforcement members and the spoke openings.

The foregoing objects can also basically be attained by providing a bicycle rim, comprising an outer annular portion, first and second annular spoke attachment portions, an inner annular portion and a plurality of reinforcement members. The outer annular portion is adapted to receive a tire thereon. The first and second annular spoke attachment portions extend from the outer annular portion and are located radially inwardly of the outer annular portion. The first and second annular spoke attachment portions face in substantially opposite directions and have a plurality of circumferentially arranged spoke openings formed therein. The inner annular portion is located radially inwardly of the first and second annular spoke attachment portions and extends between the first and second annular spoke attachment portions. The outer annular portion is free of openings within twelve millimeters or about five degrees of at least a majority of the spoke openings as measured from each center point of the majority of said spoke openings.

The foregoing objects can further be attained by providing a reinforcement member adapted to be positioned between a spoke and a rim with an outer annular portion, first and second annular spoke attachment portions extending from the outer annular portion and located radially inwardly of the outer annular portion and an inner annular portion located radially inwardly of the first and second annular spoke attachment portions and extending between the first and second annular spoke attachment portions. The reinforcement member includes a first portion, a second portion and a spoke hole. The first portion has a first maximum width that is adapted to be received in a spoke opening of the rim. The second portion has a second maximum width that forms an abutment surface between the first and second portions. The spoke hole extends through the first and second portions, the spoke hole being sized to receive a portion of the spoke therein. The first and second portions have a transverse dimension that is so dimensioned relative to the spoke opening such that the reinforcement member with the portion of the spoke coupled thereto passes through the spoke opening in a first relative orientation between the reinforcement member and the spoke opening, and is retained within the spoke opening in a second relative orientation between the reinforcement member and the spoke opening by the abutment surface.

The foregoing objects can further be attained by providing a bicycle spoke, comprising a rim attachment end, an elongated center portion, a hub attachment end, and a reinforcement member. The rim attachment end is adapted to be removably received within a spoke opening of a rim. The elongated center portion extends from the rim attachment end. The hub attachment end extends from the center portion. The reinforcement member is located on the rim attachment end such that the reinforcement member is offset from a longitudinal axis of the center portion. The reinforcement member includes a first portion and a second portion. The first portion has a first maximum width that is adapted to be received in the spoke opening of the rim. The second portion has a second maximum width that forms an abutment surface between the first and second portions. The reinforcement member has transverse dimensions that are so dimensioned relative to the spoke opening such that the reinforcement member with the rim attachment end of the spoke coupled thereto passes through the spoke opening in a first relative orientation between the reinforcement member and the spoke opening, and is retained within the spoke opening in a second relative orientation between the reinforcement member and the spoke opening by the abutment surface.

These and other objects, features, aspects and advantages of the present invention will become readily apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
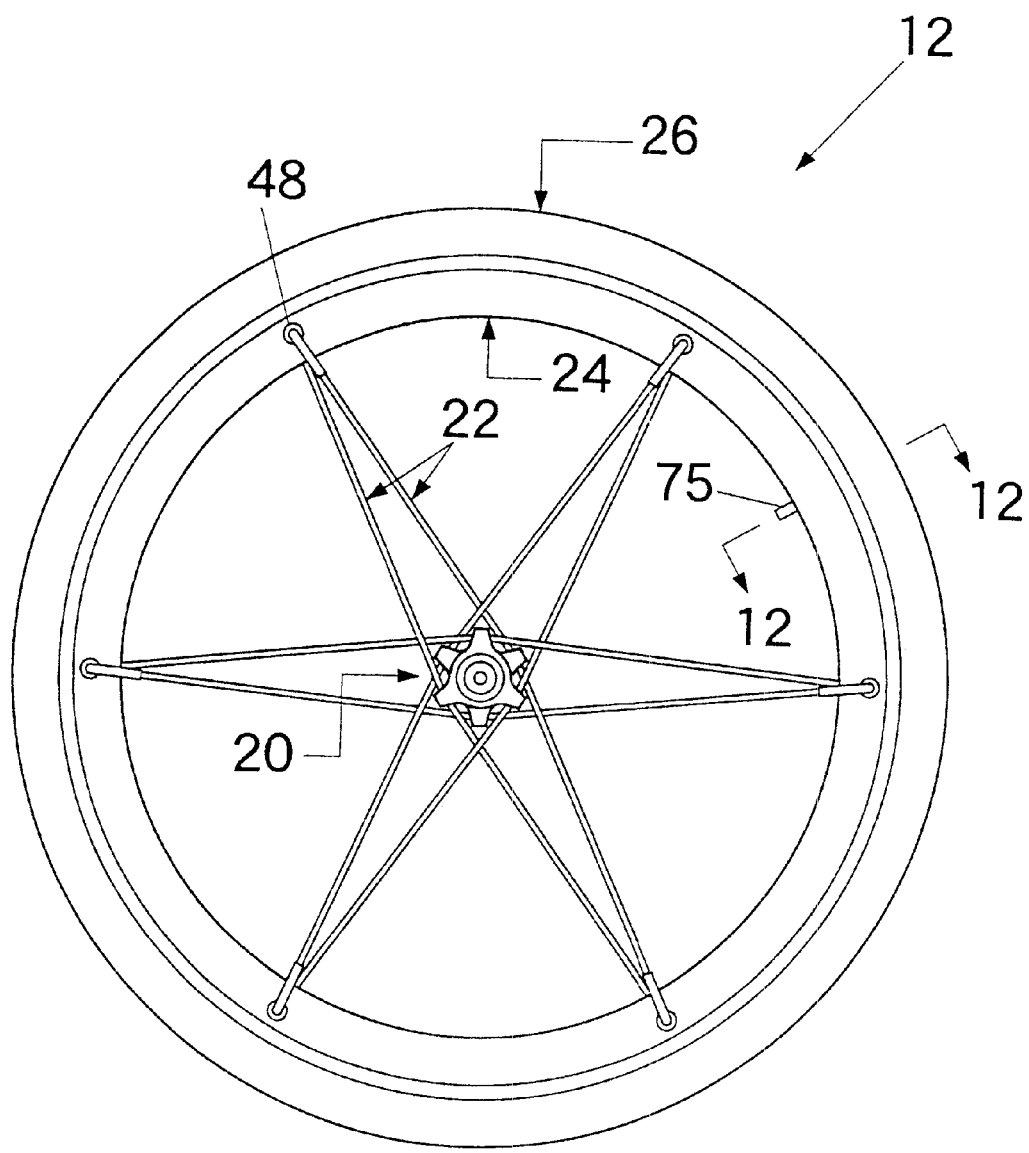
FIG. 1 is a side elevational view of a bicycle wheel with a front hub, twelve spokes with reinforcement members and a rim in accordance with a first embodiment of the present invention.
Figure 2:
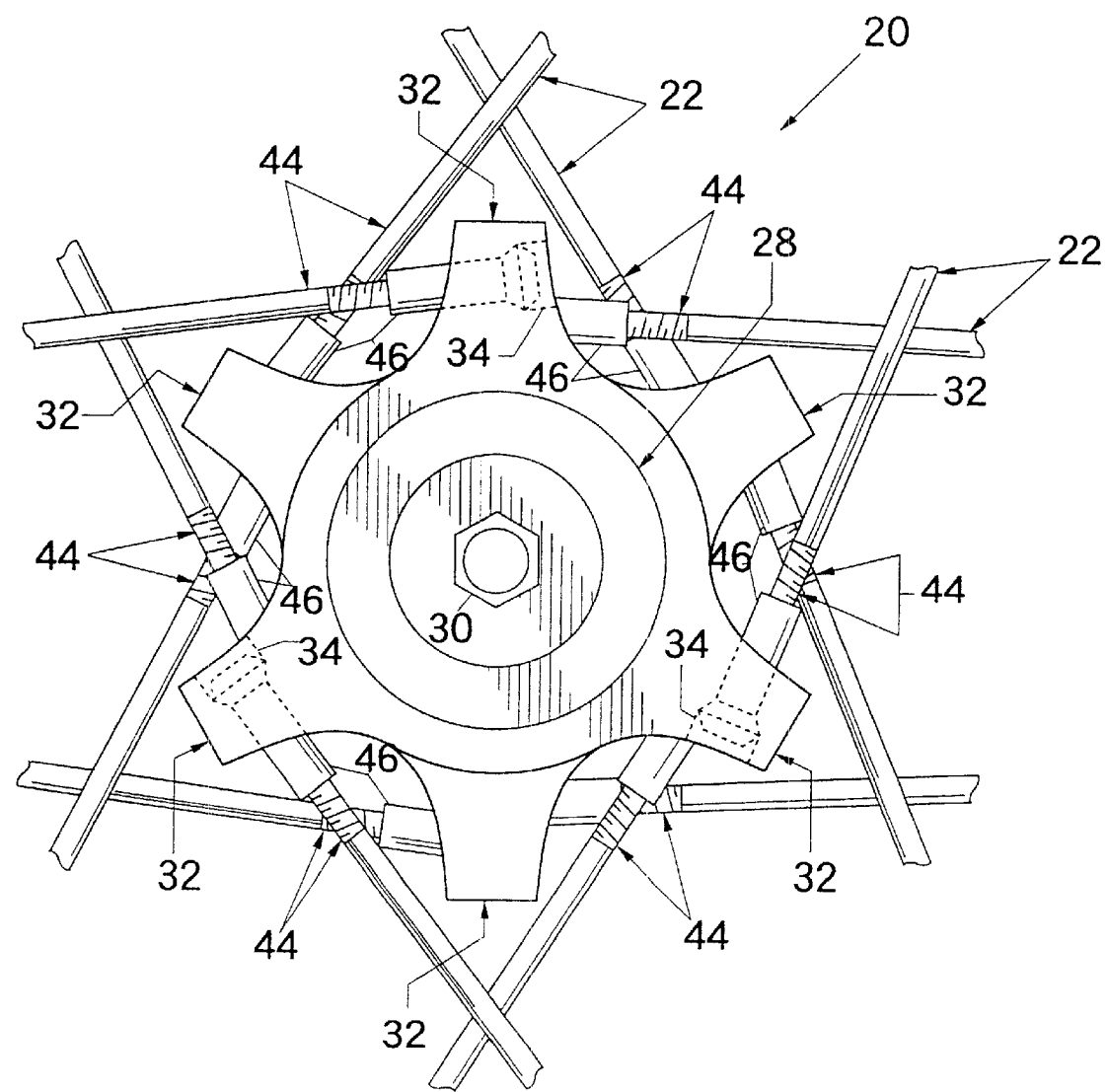
FIG. 2 is an enlarged side elevational view of the front bicycle hub illustrated in FIG. 1 with the inner end portions of the spokes coupled thereto.

Referring initially to FIGS. 1 and 2, a bicycle wheel 12 in accordance with the present invention is illustrated in accordance with the present invention. Bicycle wheel 12 can be utilized as either a front bicycle wheel or a rear bicycle wheel. Accordingly, it will be apparent to those skilled in the art from this disclosure that the description pertaining to the construction of bicycle wheel 12 applies to either a front bicycle wheel or a rear bicycle wheel.

Bicycle wheel 12 has a central hub 20, a plurality of outwardly extending spokes 22 and an annular rim 24 with a pneumatic tire 26 coupled thereto in a conventional manner. In the illustrated embodiment shown herein, bicycle wheel 12 has twelve spokes 22 extending radially between central hub 20 and annular rim 24. Of course, it will be apparent to those skilled in the art from this disclosure that the bicycle wheel 12 can have fewer or more spokes 22 than illustrated if needed and/or desired.

As seen in FIG. 2, hub 20 has a tubular body section 30 with six spoke attachment points 32 with holes 34 for coupling spokes 22 thereto. Tubular body section 30 has an axial bore that is adapted to receive a hub assembly 28 therein.

The number and shape of the spoke attachment points 32 will depend upon the number of spokes and their shapes. Accordingly, it will be apparent to those skilled in the art from this disclosure that other types and shapes of hubs can be utilized in connection with the present invention.

As seen in FIGS. 2–7, each of the spokes 22 has an outer end portion 40, a center or middle portion 42 and an inner end portion 44. Outer end portions or spoke heads 40 are coupled to rim 24 by reinforcement members or washers 48 as discussed below. Reinforcement members or washers 48 are designed to disperse the stresses applied to rim 24 by spokes 22.

Straight center portion 42 is located radially inwardly of outer end portion 40, and inner end portion 44 is located radially inwardly of the center portion 42. Each inner end portion 44 is preferably externally threaded for receiving a spoke nipple 46. Moreover, each inner end portion 44 forms a hub attachment end of each spoke 22. Inner end portion 44 is coupled to hub 20 in a relatively conventional manner. Preferably, outer end portion 40, center portion 42 and inner end portion 44 are constructed as a one-piece, unitary member with a spoke nipple 46 threadedly coupled to each inner end portion 44 of the spokes 22 for connection to hub 20.

Figure 6:
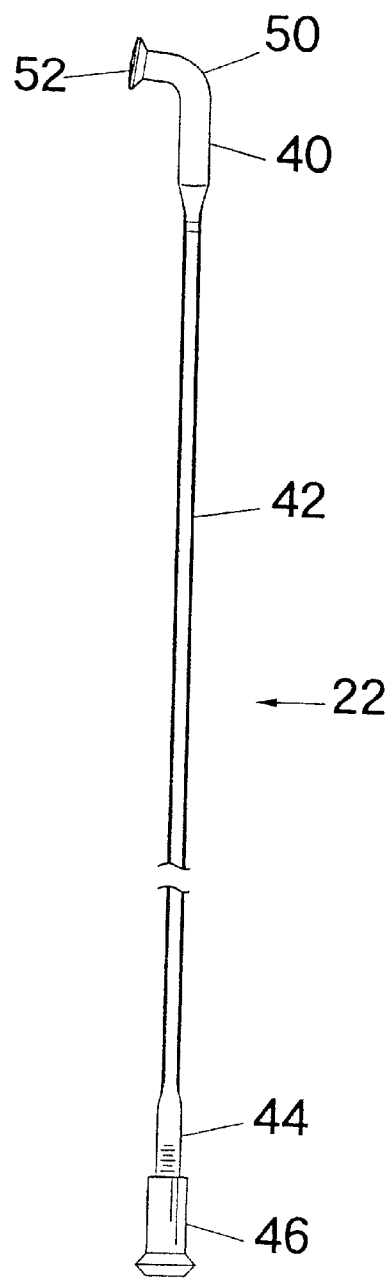
FIG. 6 is an enlarged, partial side elevational view of one of the spokes illustrated in FIGS. 1–5 in accordance with the present invention.
Figure 7:
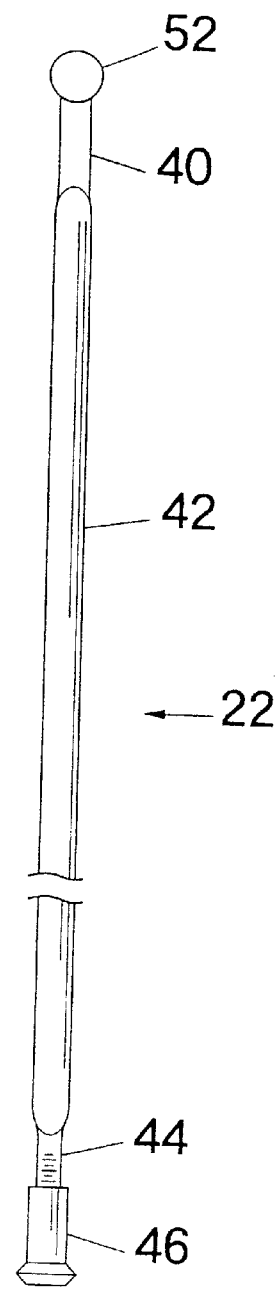
FIG. 7 is a partial side edge elevational view of the spoke illustrated in FIG. 6.

In this embodiment, as best seen in FIGS. 6 and 7, outer end portions 40 of spokes 22 each have a bent section 50 with an enlarged head 52 at the free end of bent section 50. Bent section 50 has a circular cross-section of a predetermined width or diameter. The head 52 has a larger width or diameter to secure spoke 22 to rim 24 via reinforcement member or washer 48. Each enlarged head is shaped so as not to interfere with the rim 24 when mounting the spokes 22 and reinforcement members 48 thereto, as discussed below in more detail. Each enlarged head 52 and each bent section 50 form a rim attachment end of each spoke 22. Center portions 42 and inner end portions 44 each have a circular or elliptical cross section. Of course, it will be apparent to those skilled in the art that the entire length of spokes 22 can be substantially uniform along their entire cross sections if needed and/or desired. It will also be apparent to those skilled in the art that constant cross section spokes can be utilized or spokes with a varying cross section can be utilized as needed and/or desired.

Figure 3:
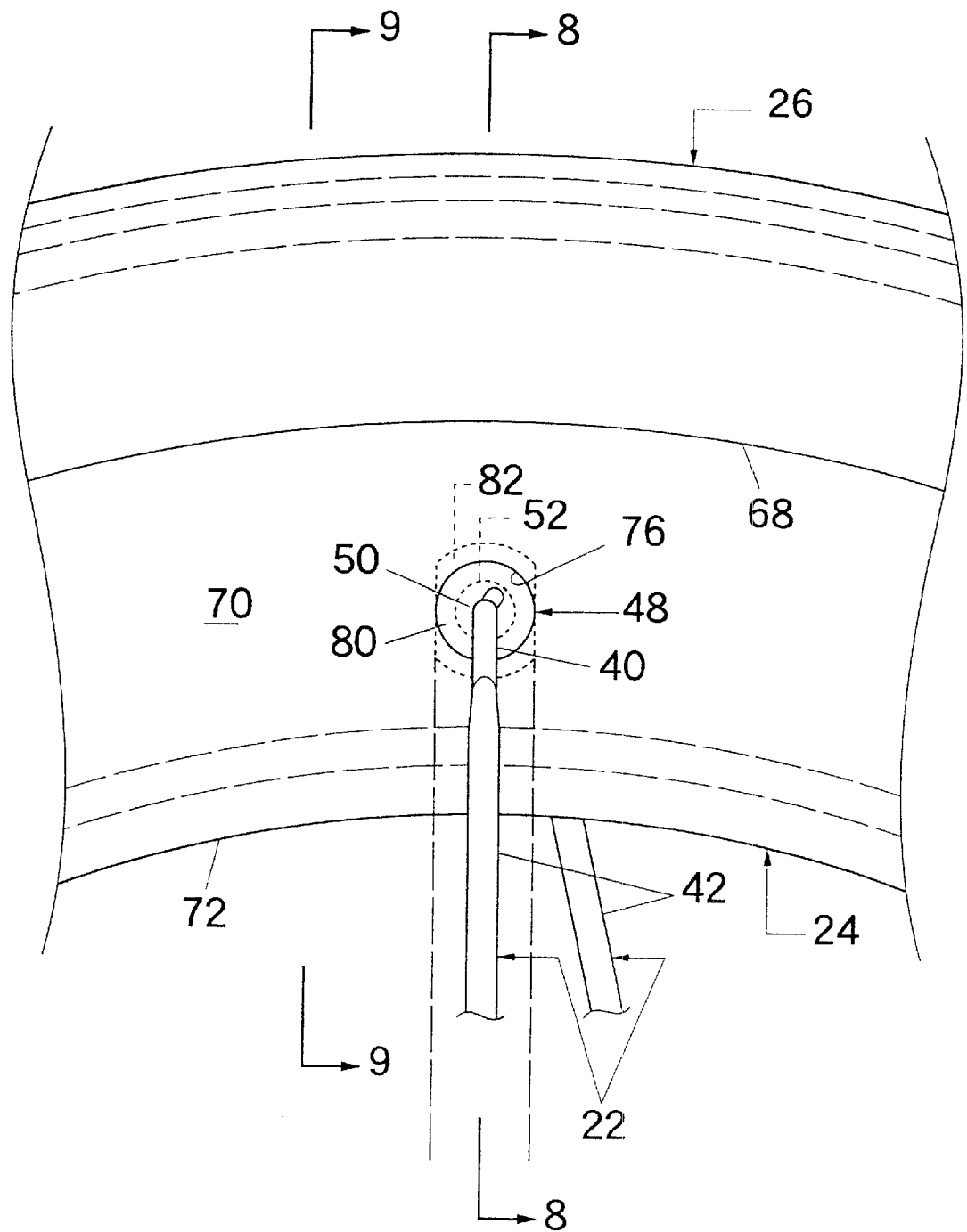
FIG. 3 is an enlarged, partial side elevational view of a portion of the front bicycle wheel illustrating the connection between the rim and two of the spokes of the bicycle wheel illustrated in FIG. 1.

As seen in FIGS. 3, 6 and 7, outer end portions 40 of spokes 22 are bent to form heads 52 at the free ends of spokes 22 which are offset from the bent sections 50. Of course, it will be apparent to those skilled in the art from this disclosure that outer end portions 40 can be bent or formed to have a different shape and/or cross section than the illustrated shapes and cross sections. In any event, the shapes and cross sections of bent section 50 and head 52 of each spoke should be configured to prevent axial movement of the spoke relative to rim 24 when the spoke is in the installed position.

Center portions 42 of spokes 22 are illustrated as being substantially straight wire type spokes with substantially elliptical cross sections. However, it will be apparent to those skilled in the art from this disclosure that center portions 42 of spokes 22 can be configured to have other types of cross sections and/or shapes. For example, center portions 42 can be circular or more rectangular in cross section with the shape being uniformed along the entire length of center portion 42. Alternatively, the cross section of center portion 42 can vary along its length such that the cross section of center portion 42 becomes wider as it approaches hub 20. In other words, the thickness and/or width of center portion 42 can be either uniformed or varied as needed and/or desired.

Inner end portions 44 of spokes 22 are threaded for receiving conventional spoke nipples 46 thereon. More specifically, inner end portions 44 of spokes 22 are inserted through one end of bores 34 of hub 20, and then spoke nipples 46 are inserted through the other end of bores 34. The headed or flanged portion of the spoke nipples 46 engage an internal abutment surface of bores 34 to fixedly secure inner end portions 44 of spokes 22 to hub 20. Accordingly, spokes 22 can be tightened in a substantially conventional manner between hub 20 and rim 24 to secure inner end portions 44 of spokes 22 thereto.

Rim 24 is a so-called deep rim in which the rim height is greater than the rim width and is designed to have pneumatic tire 26 fastened thereto by a tire cement. It will be apparent to those skilled in the art that the shape of rim 24 could be modified to accommodate different types of tires such as "clinchers" as needed and/or desired, as discussed below. Of course, rim 24 can have other shapes to accommodate other types of tires as needed and/or desired without departing from the scope of the present invention. Rim 24 is constructed of a substantially rigid material, such as those materials, which are well known in the art. For example, rims 24 can be constructed of any suitable metallic material, such as plated steel, stainless steel, aluminum, magnesium or titanium, as well as other non-metallic materials, such as a carbon fiber composite, which can be utilized for a bicycle wheel.

Figure 12:
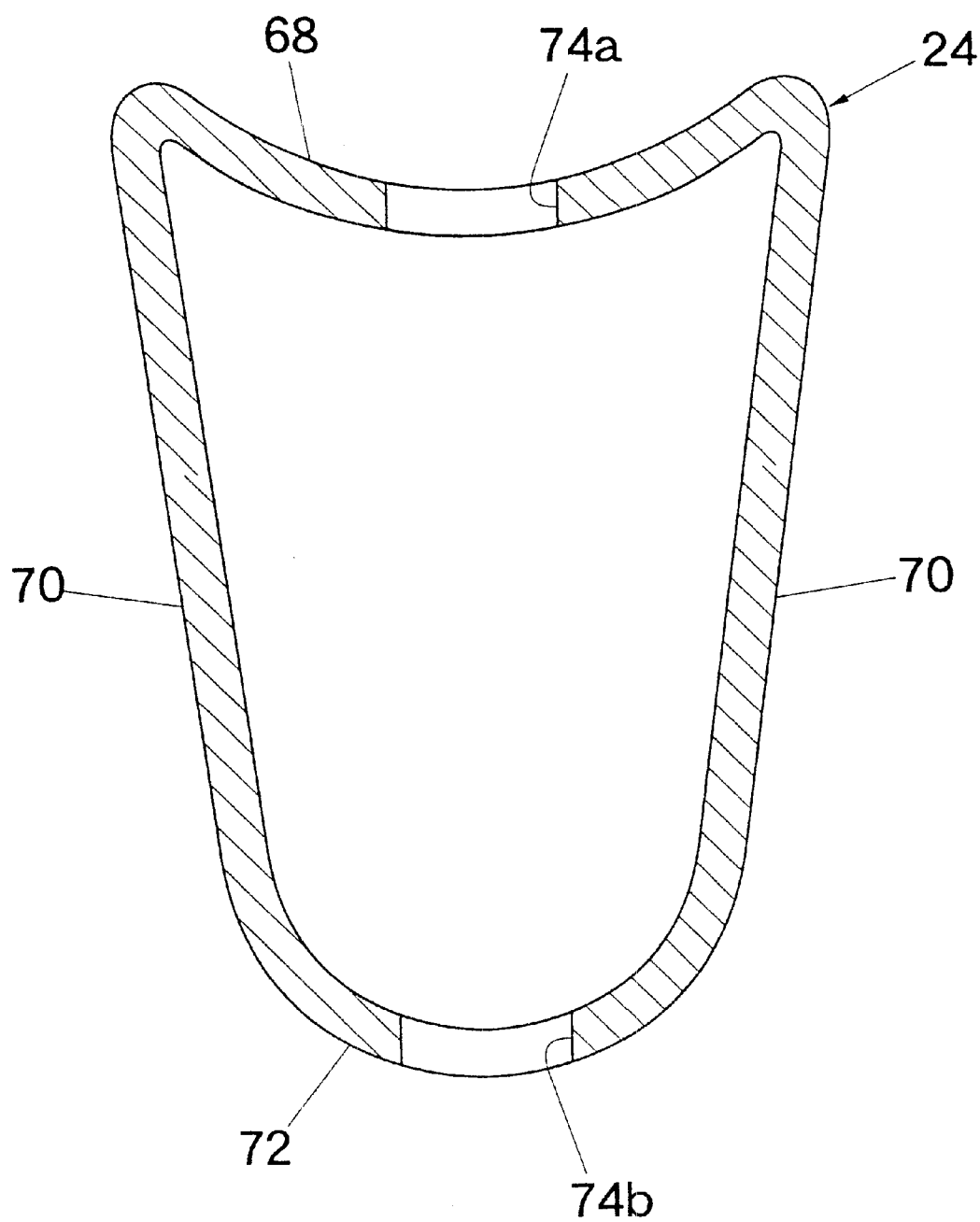
FIG. 12 is an enlarged, partial cross-sectional view of the bicycle rim as seen along section 12—12 of FIG. 1, illustrating valve holes formed in the rim.
Figure 13:
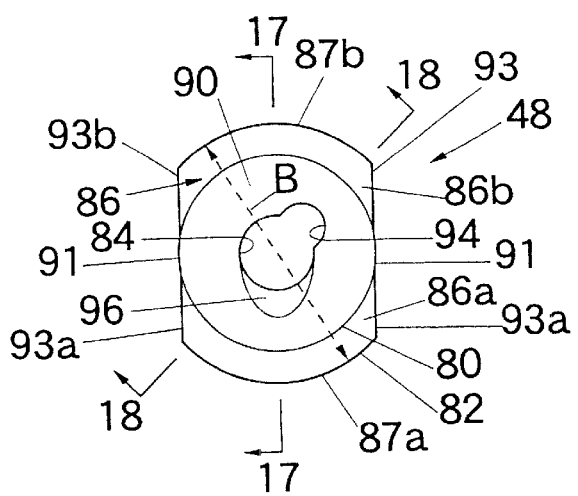
FIG. 13 is an enlarged side elevational view of one of the reinforcement members or washers in accordance with the present invention.

Rim 24 is substantially circular as seen in side elevation (FIG. 1), and has an outer annular portion 68, a pair of annular spoke attachment portions 70 and an inner annular portion 72. The outer annular portion 68 is adapted to receive pneumatic tire 26 thereon. As seen in FIG. 12, outer annular portion 68 of rim 24 has a valve aperture 74a for receiving part of a valve 75 therein. Inner annular portion 72 also includes a valve aperture 74b for receiving part of the valve 75. Preferably, outer annular portion 68 is free of openings except for valve aperture 74a. Valve 75 is relatively conventional and preferably centered between adjacent pairs of spokes 22. Accordingly, valve 75 will not be discussed or illustrated in detail herein.

The annular spoke attachment portions 70 are located radially inward of outer annular portion 68, with inner annular portion 72 connecting spoke attachment portions 70 together. In other words, spoke attachment portions 70 face in substantially opposite directions and extend radially inwardly from the outer annular portion 68. Therefore, rim 24 is a tubular member with a hollow interior area formed by outer annular portion 68, spoke attachment portions 70 and inner annular portion 72. In this embodiment, outer annular portion 68 of rim 24 is designed for use with "tubular" or "sew-up" type tires which are cemented to outer annular portion 68.

Each spoke attachment portion 70 has a plurality of circumferentially spaced spoke openings 76 for receiving the outer end portions 40 of spokes 22 with reinforcement members 48 located thereon. In this embodiment, opposing spoke openings 76 are formed at the same circumferential location. Of course, the configurations and locations of spoke openings 76 could be modified as needed and/or desired. For example, opposing spoke openings 76 could be arranged in a staggered configuration.

As mentioned above, outer annular portion 68 is preferably formed without any openings or access apertures, except for valve aperture 74a. Preferably, outer annular portion 68 is at least free of openings within about five (5) degrees in each direction from a radial line extending from the center of the hub 20 through the center of spoke openings 76. Alternatively, the outer annular portion 68 is free of openings within about twelve millimeters of at least a majority of the spoke openings 76 as measured from an axial center point of the spoke openings 76 to a center point of an access aperture on the outer annular portion 68. In other words, it is not necessary to provide access apertures in the outer annular portion 68 for inserting the spokes 22 with the reinforcement members 48 therethrough, as discussed below in more detail. However, valve aperture 74a could be located adjacent one or two of the spoke openings 76 such that at least a majority of spoke openings 76 are free of openings within about five (5) degrees in each direction from a radial line extending from the center of the hub 20 through the center of spoke openings 76.

Spoke openings 76 are preferably equally spaced about the circumference of spoke attachment portions 70. In this embodiment, the plurality of spoke openings 76 are preferably circular openings that are larger than the outer end portions 40 of the spokes 22. Spoke openings 76 of the present invention are larger than conventional spoke openings. Therefore, reinforcement members 48 distribute the forces on rim 24 over a greater area than ordinary round spokes such that stress fracturing and/or tearing of rim 24 is minimized.

Preferably, spoke openings 76 have circumferential widths of at least approximately 5.0 millimeters. More specifically, spoke openings 76 preferably are substantially circular openings that have circumferential widths or diameters of approximately 6.6 millimeters (+ or −0.05 millimeters). Of course, it will be apparent to those skilled in the art that spoke openings 76 could have other shapes and/or sizes as needed and/or desired without departing from the scope of the present invention. In any event, spoke openings 76 are sized and configured such that outer end portions 40 of spokes 22 with reinforcement members 48 located thereon can be inserted through spoke openings 76. Moreover, spoke openings 76 are sized and configured to retain outer end portions 40 with reinforcement members 48 mounted thereon within spoke openings 76 when spokes 22 are installed to rim 24 and hub 20. Furthermore, enlarged heads 52 of spokes 22 are shaped so as not to interfere with the insertion of outer end portions 40 with reinforcement members 48 mounted thereon into spoke openings 76. Therefore, wheel 12 can be easily assembled, without the need for additional access apertures formed in outer annular portion 68.

Figure 4:
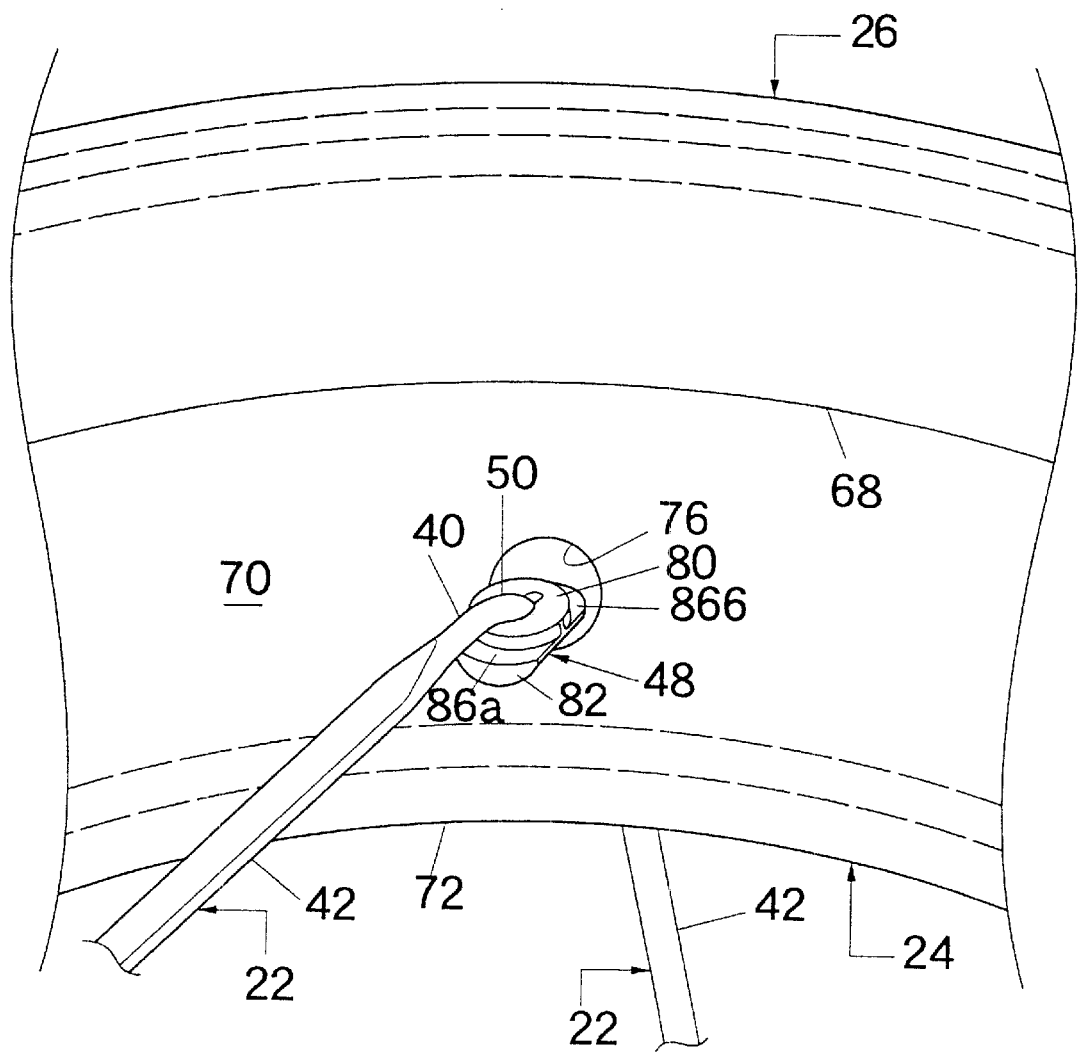
FIG. 4 is an enlarged, partial side elevational view of a portion of the front bicycle wheel illustrating the spoke and reinforcement member in a first orientation prior to inserting the outer end of the spoke and reinforcement member into one of the spoke openings.
Figure 5:
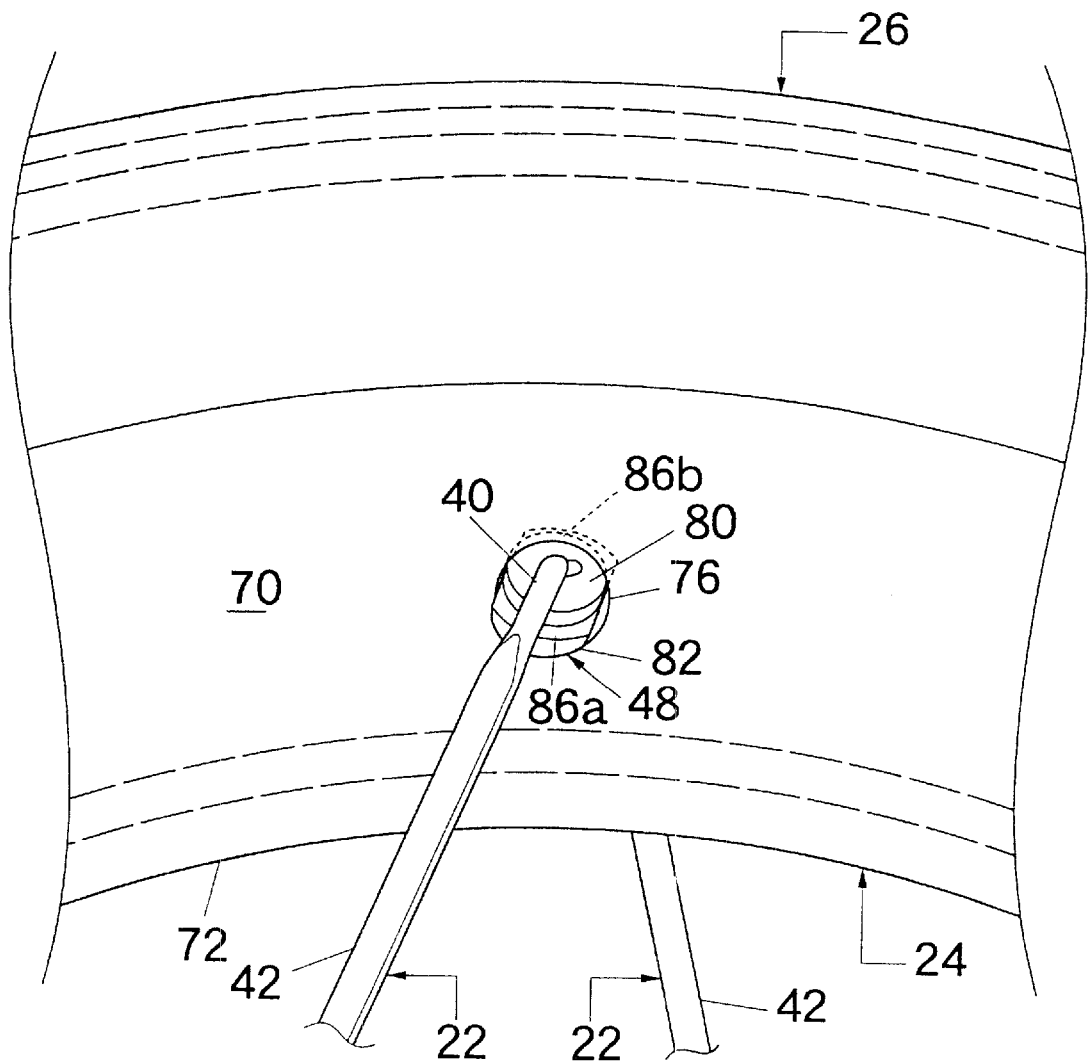
FIG. 5 is an enlarged, partial side elevational view of a portion of the front bicycle wheel illustrating the spoke and reinforcement member in the first orientation after starting to insert the reinforcement member and the outer end of the spoke into the spoke opening of the rim.

Referring to FIGS. 3–5, 8–11 and 13–18, reinforcement members 48 will now be discussed in more detail. Reinforcement members 48 are designed to disperse the stresses applied to rim 24 by spokes 22. Reinforcement members 48 are designed to pass through the spoke openings 76 in a first relative orientation between reinforcement members 48 and the spoke openings 76, as seen in FIGS. 4 and 5. The reinforcement members 48 are also designed to be retained within the spoke openings 76 in a second relative orientation between the reinforcement members 48 and the spoke openings 76, as seen in FIG. 3. Reinforcement members 48 are preferably elongated disk shaped members with each reinforcement member or washer 48 having a first (smaller) substantially circular stepped portion 80, a second (larger) elongated stepped portion 82 and a centrally located spoke hole 84.

Preferably, each reinforcement member or washer 48 is constructed as a one-piece, unitary metallic member. An example of one suitable material for reinforcement members 48 is aluminum alloy. Of course, other materials can be used. Moreover, reinforcement members 48 can be made of the same material as rim 24 or a different material from rim 24. It will be readily apparent to those skilled in the art from this disclosure that reinforcement members 48 do not have to be stepped as illustrated, but can have other shapes that can carry out the advantages of the present invention.

Preferably, reinforcement members 48 have an axial thickness of approximately 3.2 millimeters. The diameters or widths of first and second portions 80 and 82 should be relatively large to disperse the stresses on rim 24 from spokes 22. The axial thickness of first (smaller) stepped portion 80 is approximately 1.4 millimeters, while the axial thickness of second (larger) stepped portion 82 is approximately 1.8 millimeters. The word approximately as used herein means ±0.1 millimeters.

It will be readily apparent to those skilled in the art from this disclosure that reinforcement members 48 can be made thicker than the thickness of spoke attachment portion 70, or can be the same thickness as the thickness of spoke attachment portion 70. In any event, reinforcement members 48 have first and second transverse dimensions A and B (noted in FIGS. 13 and 14) that are so dimensioned relative to spoke openings 76 such that the reinforcement members 48 with the outer portions 40 of the spokes 22 coupled thereto can pass through spoke openings 76 in the first relative orientation and be retained in spoke openings 76 in the second orientation.

First substantially circular stepped portion 80 of each reinforcement member 48 can be frictionally retained within one of the spoke openings 76 of rim 24. Since spokes 22 are placed under tension between hub 20 and rim 24, spokes 22 apply an inward radial force at circumferentially spaced locations that correspond to spoke openings 76. Reinforcement members 48 disperse the stresses on rim 24 from spokes 22. Specifically, first substantially circular stepped portion 80 of each reinforcement member 48 increases the effective diameter or width of spoke 22 to spread out the stresses on the rim 24. Accordingly, the strength of rim 24 is increased without adding thickness to the wall of spoke attachment portion 70.

Figure 8:
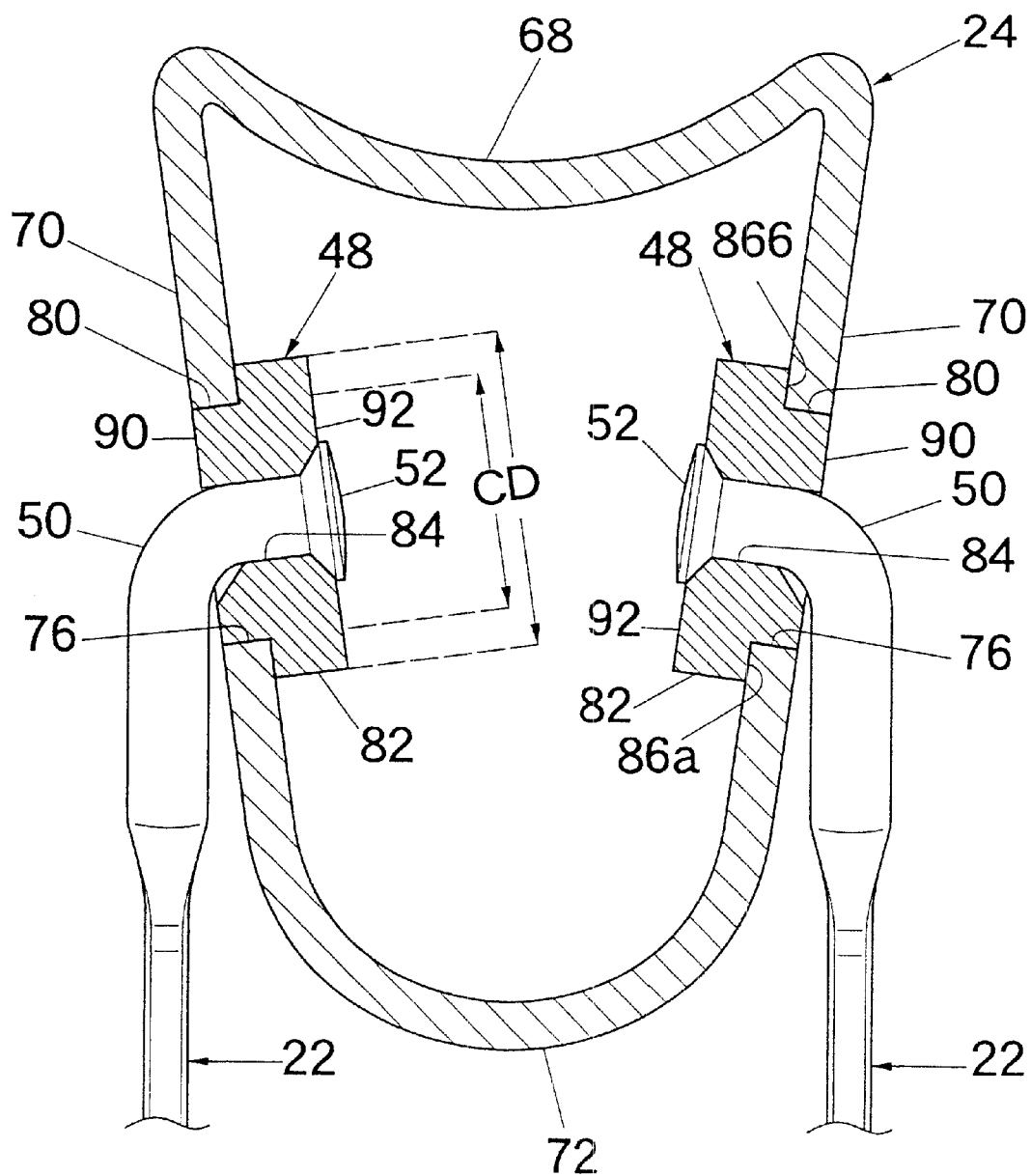
FIG. 8 is a partial, cross-sectional view of the bicycle rim as seen along section line 8—8 of FIG. 3 with a pair of spokes illustrated in elevation and the rim and reinforcement members illustrated in cross-section.
Figure 9:
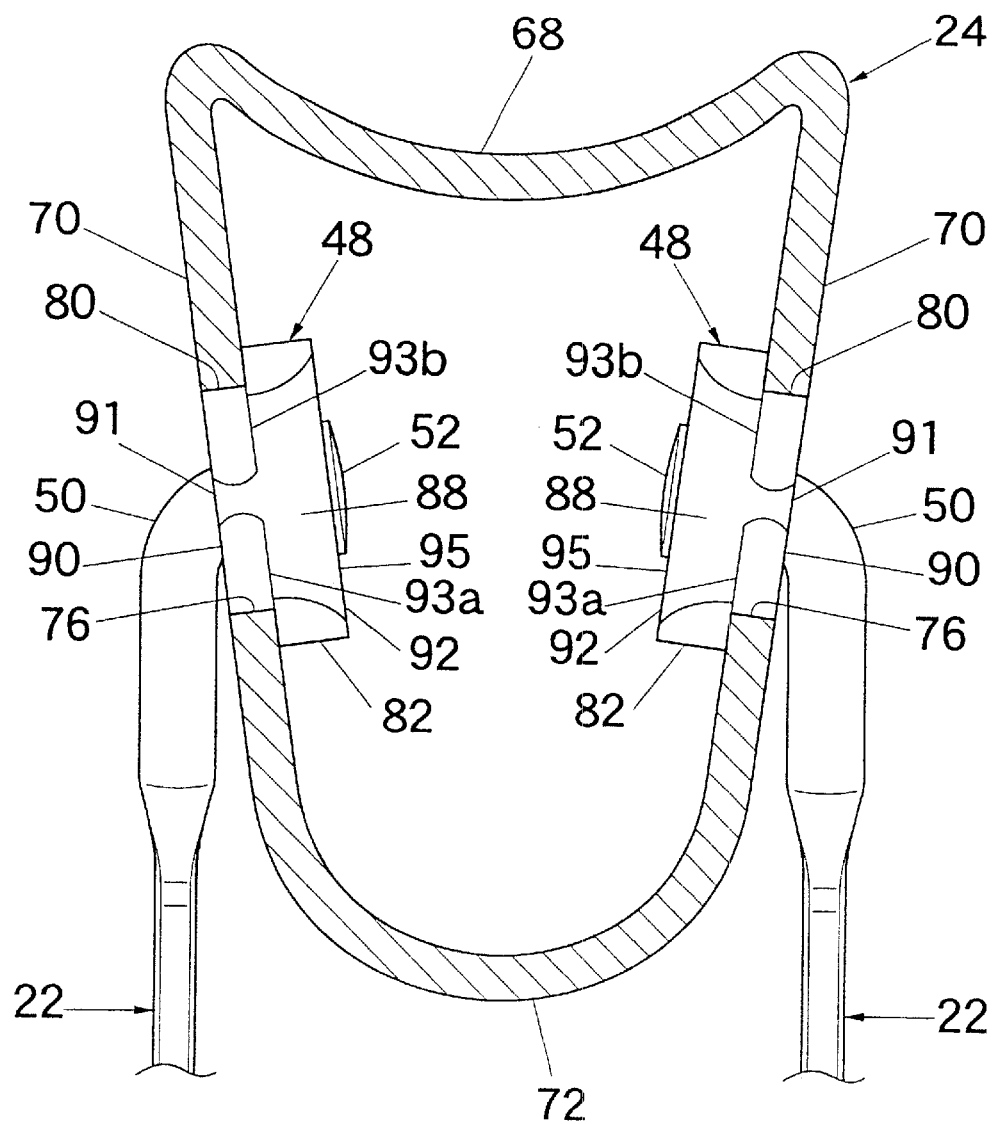
FIG. 9 is a partial, cross-sectional view of the bicycle rim as seen along section line 9—9 of FIG. 3.
Figure 10:
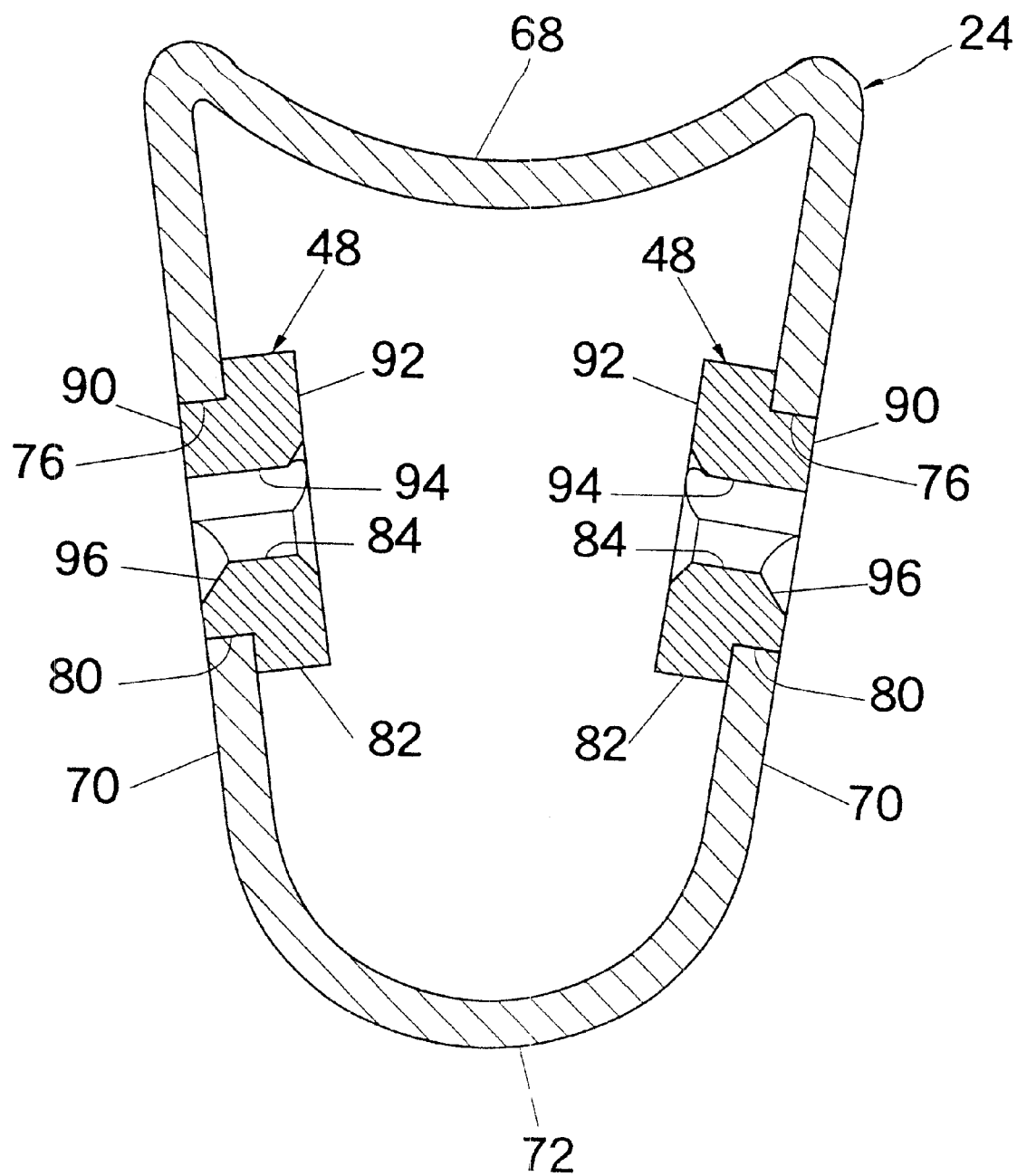
FIG. 10 is a partial, cross-sectional view of the bicycle rim as seen along section line 8—8 of FIG. 3 with the pair of spokes removed from the reinforcement members and the rim.
Figure 11:
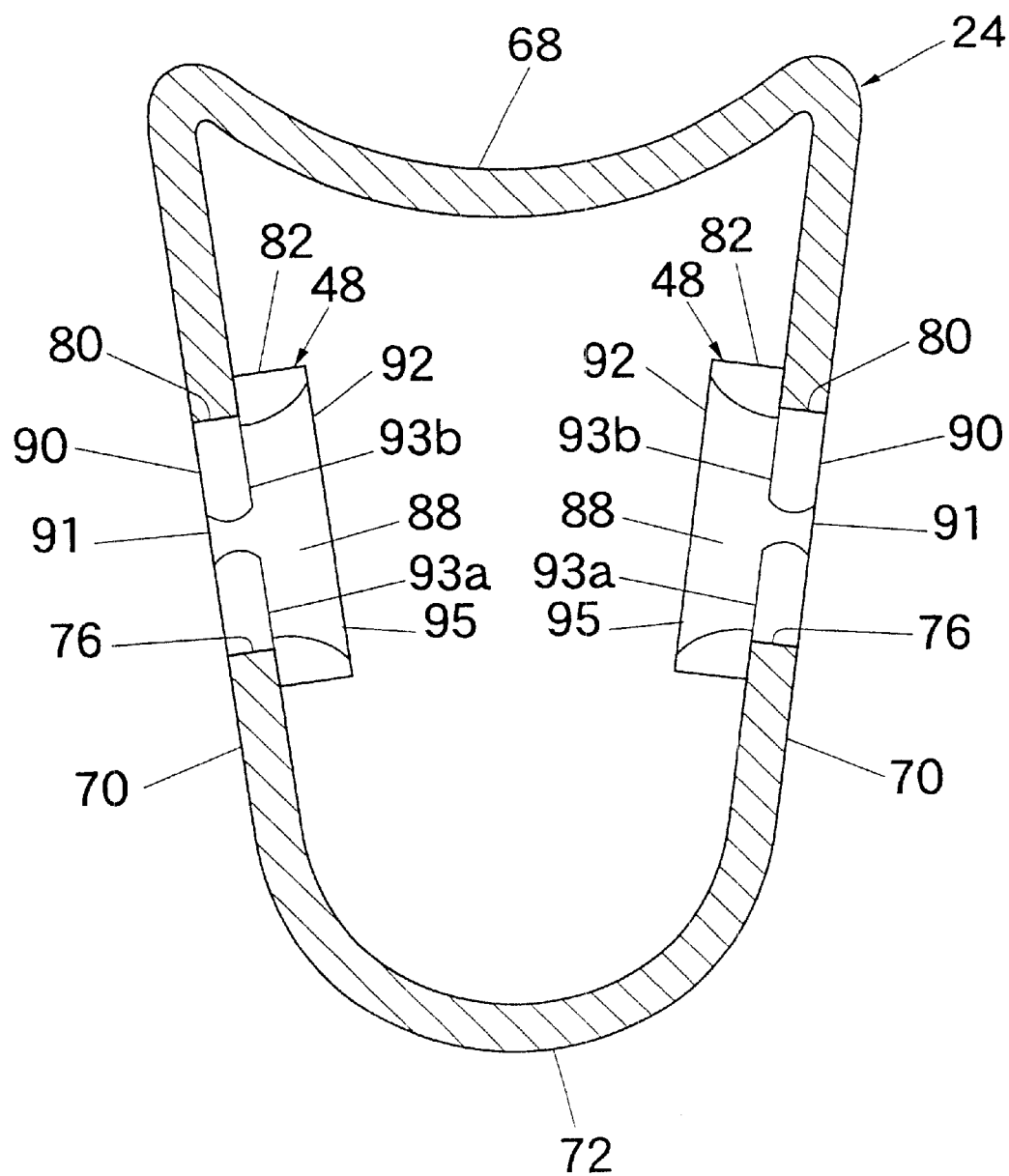
FIG. 11 is a partial, cross-sectional view of the bicycle rim as seen along section 9—9 of FIG. 3 with the spokes removed from the reinforcement members and the rim.

Referring to FIG. 8, first substantially circular stepped portion 80 of each reinforcement member 48 has a first maximum width C and each second elongated stepped portion 82 has a second maximum width D that forms an abutment surface 86 between first and second portions 80 and 82. First substantially circular stepped portions 80 are sized and configured to be located within spoke opening 76 of attachment portions 70 of rim 24, such that abutment surface 86 contacts the interior of rim 24. In this embodiment, each second transverse dimension B (noted in FIG. 13) is substantially equal to the maximum width D (noted in FIG. 8) of second elongated stepped portions 82. Therefore, abutment surface 86 retains the reinforcement members 48 in the spoke openings 76.

Preferably, abutment surface 86 of each reinforcement member 48 is formed by two abutment sections 86a and 86b (bottom and top abutment sections 86a and 86b) located on opposite sides of first portion 80. Abutment sections 86a and 86b extend from a pair of end surfaces 87a and 87b (bottom and top end surfaces 87a and 87b) of second portion 82 to the outer periphery of first portion 80. End surfaces 87a and 87b are partial cylindrical surfaces extending in an axial direction of reinforcement members 48. In other words, end surfaces 87a and 87b lie on an imaginary cylinder with a diameter corresponding to the second maximum width D (noted in FIG. 8) of second portion 82 and the second transverse dimension B of reinforcement member 48. Thus, reinforcement members 48 can be retained in spoke openings 76.

Each reinforcement member 48 includes a pair of curved side surfaces 88 extending generally in the longitudinal direction of the reinforcement members 48. The first transverse dimension A (noted in FIG. 14) is measured between the pair of curved side surfaces 88. Transverse dimension A is preferably the same, or slightly smaller than the size of spoke openings 76. More specifically, transverse dimension A (noted in FIG. 14) is preferably 6.5 millimeters±0.05 millimeters. Curved side surfaces 88 are preferably formed on an imaginary circle or cylinder with a diameter of approximately 6.5 millimeters±0.05 millimeters. Accordingly, transverse dimension A can be considered the diameter of this imaginary circle or cylinder. Due to this arrangement, reinforcement members 48 can be inserted into spoke openings 76 with outer portions 40 of spokes 22 coupled thereto, as seen in FIGS. 4 and 5.

Figure 14:
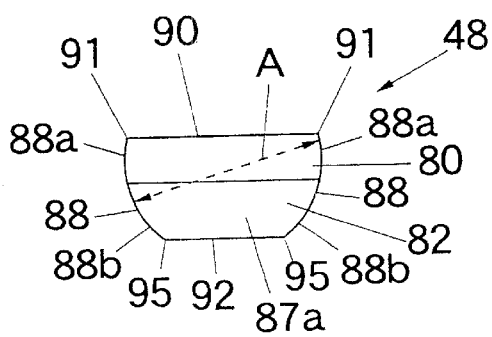
FIG. 14 is an end edge elevational view of the reinforcement member or washer illustrated in FIG. 13.
Figure 15:
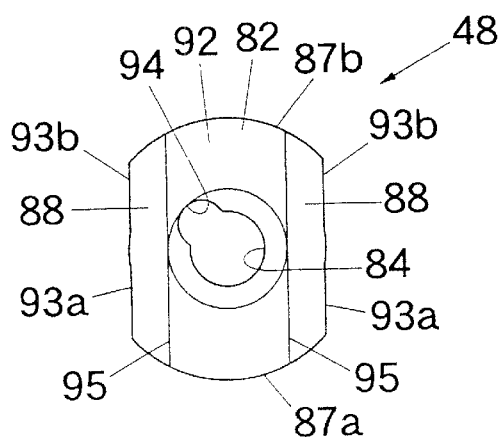
FIG. 15 is an opposite side elevational view of the reinforcement member or washer illustrated in FIGS. 13 and 14.
Figure 16:
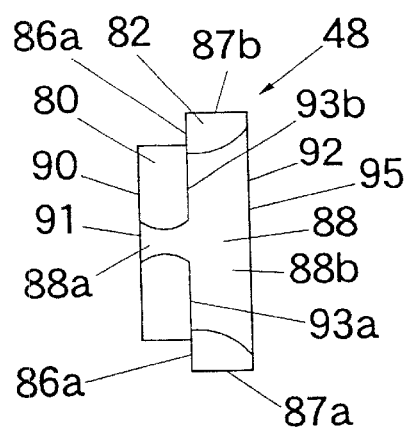
FIG. 16 is a side edge elevational view of the reinforcement member or washer illustrated in FIGS. 13–15.
Figure 17:
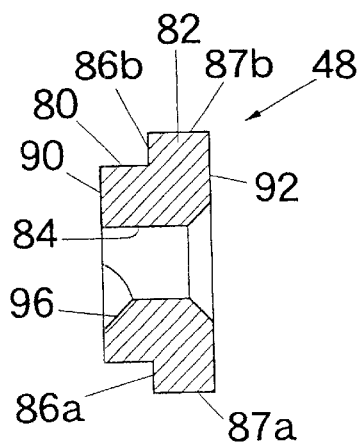
FIG. 17 is a longitudinal cross-sectional view of the reinforcement member or washer illustrated in FIGS. 13–16 as seen along section line 17—17 of FIG. 13.
Figure 18:
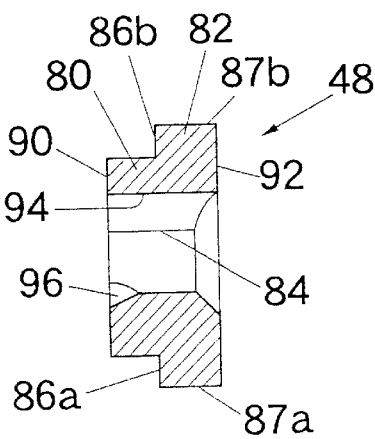
FIG. 18 is a longitudinal cross-sectional view of the reinforcement member or washer illustrated in FIGS. 13–16 as seen along section line 18—18 of FIG. 13.
Figure 19:
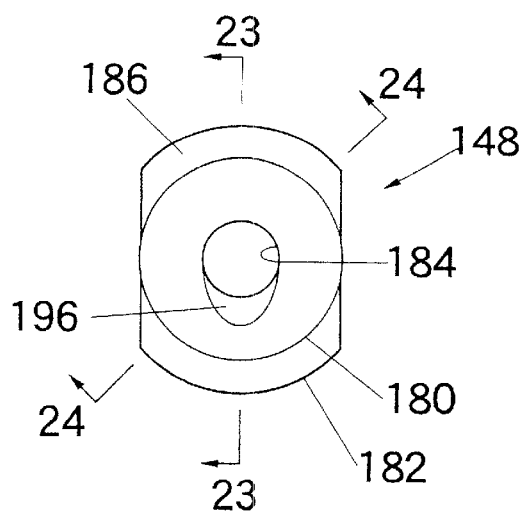
FIG. 19 is an enlarged side elevational view of a modified reinforcement member or washer in accordance with a second embodiment of the present invention.
Figure 22:
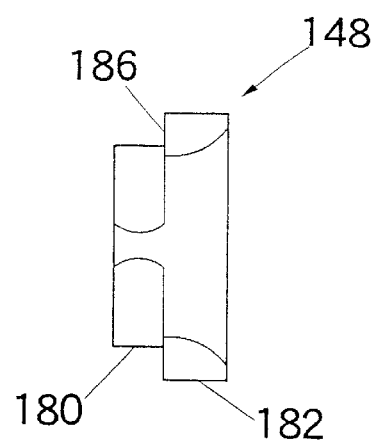
FIG. 22 is a side edge elevational view of the reinforcement member or washer illustrated in FIGS. 19–21.
Figure 20:
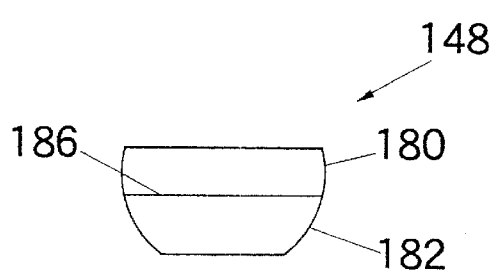
FIG. 20 is an end edge elevational view of the reinforcement member or washer illustrated in FIG. 19.
Figure 23:
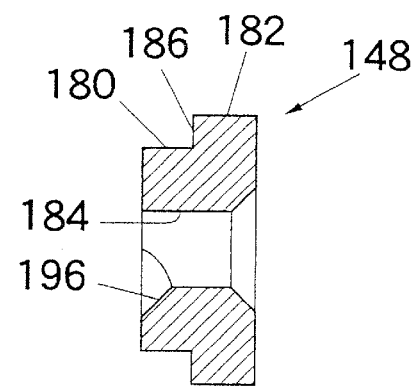
FIG. 23 is a longitudinal cross-sectional view of the reinforcement member or washer illustrated in FIGS. 19–22 as seen along section line 23—23 of FIG. 19.
Figure 21:
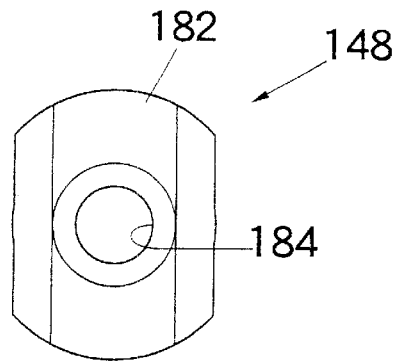
FIG. 21 is an opposite side elevational view of the reinforcement member or washer illustrated in FIGS. 19 and 20.
Figure 24:
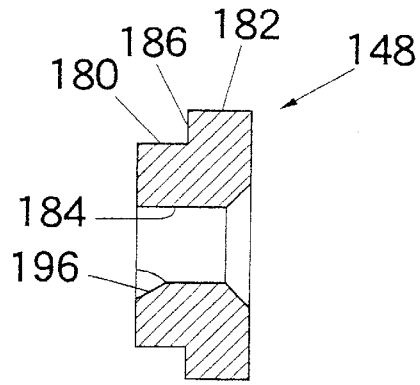
FIG. 24 is a longitudinal cross-sectional view of the reinforcement member or washer illustrated FIGS. 19–22 as seen along section line 24—24 of FIG. 19.

Basically, curved side surfaces 88 are formed by a pair of first curved side sections 88a formed on the outer periphery of first portion 80, and a pair of second curved side sections 88b formed on second portion 82 as best seen in FIG. 14. The maximum width C (noted in FIG. 8) of first portion 80 is preferably approximately 6.5 millimeters (+0.09 millimeters or −0.01 millimeters). Accordingly, the maximum width C of first portion 80 can be slightly larger than the first transverse dimension A. Therefore, in the illustrated embodiment, first portion 80 does not have a completely cylindrical outer peripheral surface and has the pair of first curved side sections 88a. In other words, the outer peripheral surface of the first portion 80 is substantially cylindrical, except for the presence of the pair of first curved side sections 88a. On the other hand, spoke openings 76 are preferably circular openings. Of course, it will be apparent to those skilled in the art that various shapes and sizes of spoke opening 76 and reinforcement members 48 could be utilized without departing from the scope of the present invention.

Curved side surfaces 88 are basically convex curved surfaces that extend between a pair of axial faces 90 and 92 of first and second portions 80 and 82 of reinforcement members 48 to form several pairs of parallel edges. Specifically, first edges 91 are formed at end face 90, second edges 93a and 93b are formed at abutment sections 86a and 86b, and third edges 95 are formed at end face 92.

Preferably, each reinforcement member 48 has a spoke hole 84 extending therethrough with one of the spokes 22 received in the spoke hole 84 as mentioned above. In this embodiment, each of the spoke holes of each reinforcement member 48 is non-circular in transverse cross-section.

Spoke holes 84 of reinforcement washers 48 are designed so that spokes 22 can freely pass therethrough. In the illustrated embodiment, the center portions 42 of spokes 22 are elliptical in cross-section. Accordingly, spoke holes 84 have longitudinally extending slots 94 that increase the effective diameter of width of spoke holes 84 to allow the center portions 42 of spokes 22 to pass therethrough.

A slanted cutout or notch 96 is formed on the axial face of first stepped portion 80. This notch 96 accommodates the bent section 50 of the outer end portion of spoke 22. Preferably, notch 96 is located approximately 135° from slot 94. Thus, when bent section 50 of spoke 22 is seated in notch 96, movement of spoke 22 in spoke hole 84 is limited. Notch 96 is arranged so the center portion 42 is substantially parallel to the curved side surfaces 88 and the edges 93a and 93b.

In assembling bicycle wheel 12, reinforcement members 48 are first placed on the outer end portions 40 of spokes 22. Specifically, the inner end portions 44 of spokes 22 are first inserted into spoke holes 84 of reinforcement members 48. Then, the spokes 22 are rotated so that the longer width portion of the elliptical center portions 42 are aligned with slots 94 such that the center portions 42 of spokes 22 can pass through spoke holes 84 of reinforcement members 48. Once the center portions 42 of spokes 22 have passed through spoke holes 84 of reinforcement members 48, the spokes 22 can be further rotated within spoke holes 84 such that the bent section 50 of the spokes 22 are seated in notches 96 and heads 52 of spokes 22 engage the axial surface of second stepped portion 82 of reinforcement members 48.

Now, the spokes 22 with reinforcement members 48 thereon can be installed into rim 24. The outer end portions 40 of spokes 22 with reinforcement members 48 are inserted into the spoke openings 76 in the spoke attachment portions 70 of rim 24 at an angle (first orientation) such that the reinforcement members 48 pass completely through spoke openings 76. Once the outer end portions 40 of spokes 22 and washers 48 have fully entered the interior of rim 24, the first stepped portions 80 of reinforcement washers 48 are seated in the spoke openings 76 of rim 24 (moved to the second orientation). Preferably, spoke openings 76 are slightly larger than or the same size as the maximum width C of stepped portion 80 such that washers 48 are either loosely received within spoke openings 76 or securely received via interference fit.

Now, the inner end portions 44 of spokes 22 are inserted into openings 34 of hub 20. Spoke nipples or nuts 46 are also inserted into openings 34 and threaded onto the inner end portions 44 of spokes 22. The tension in spokes 22 is then adjusted such that rim 24 is properly positioned about hub 20. The wheel 12 can now be installed on a frame of a bicycle in a conventional manner via hub 20.

Second Embodiment

Referring now to FIGS. 19–24, an alternate reinforcement member 148 is illustrated in accordance with a second embodiment of the present invention. Basically, reinforcement member 148 is designed to be utilized with rim 24 of the first embodiment. More specifically, reinforcement member 148 is identical to reinforcement member 48 of the first embodiment, except that reinforcement member 148 is designed to be utilized with a spoke having a circular cross-section (not shown) instead of an elliptical cross-section, as seen in the first embodiment. In view of the similarities between the reinforcement members 48 and 148, the following description of the reinforcement member 148 will focus mainly on the differences. Accordingly, it will be apparent to those skilled in the art from this disclosure that most of the description of the reinforcement member 48 applies to the description of reinforcement member 148.

Reinforcement member 148 is substantially identical to reinforcement member 48 discussed above except that spoke hole 184 is especially designed for a spoke with a circular cross-section. Specifically, reinforcement washer 148 has a first (smaller) substantially circular stepped portion 180, and a second elongated (larger) stepped portion 182 with the centrally located spoke hole 184 extending axially therethrough. An abutment surface 186 is formed between first and second stepped portions 180 and 182. In this embodiment, the spoke hole 184 is a substantially cylindrical bore except at the axial end adjacent the second stepped portion 182 in which the hole 184 becomes frustoconical and the other axial end which has a slanted cutout or notch 196. In other words, longitudinal slot 94 of spoke hole 84 of the first embodiment has been eliminated in this embodiment. The reinforcement member 148 is mounted in rim 24 in substantially the same manner as discussed above regarding the reinforcement member 48 of the first embodiment.

Third Embodiment

Figure 25:
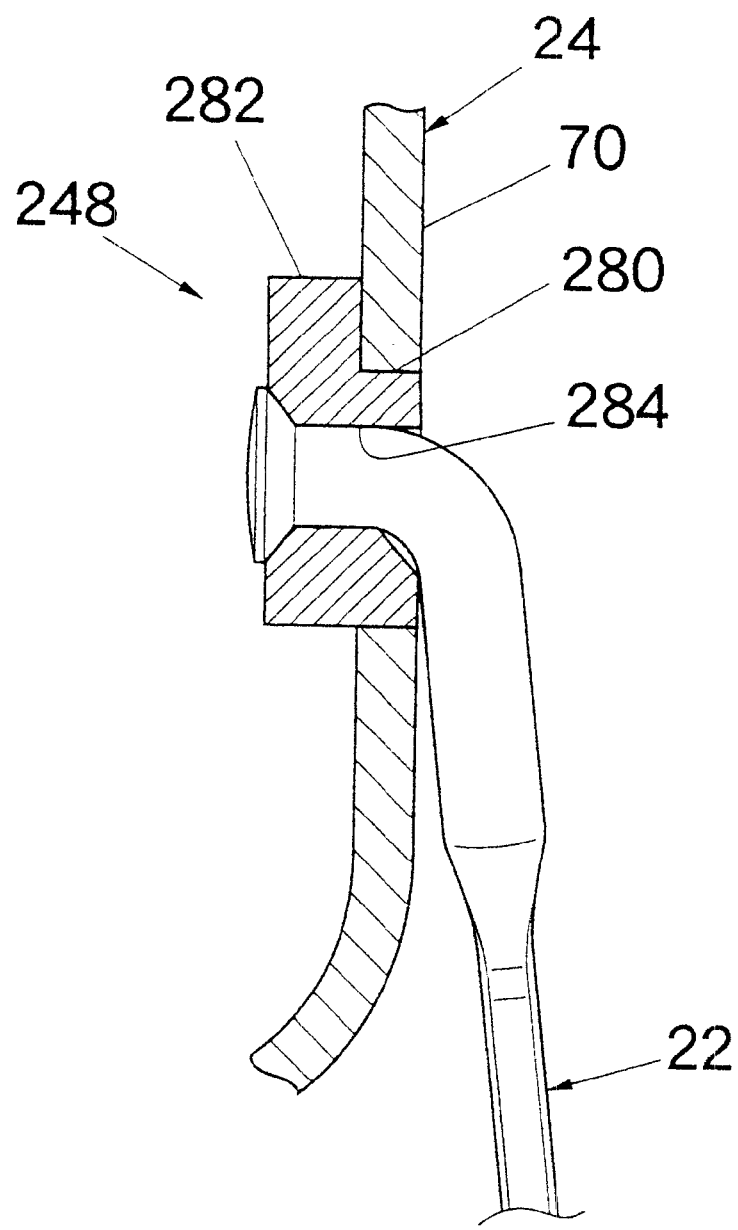
FIG. 25 is a partial, cross-sectional view of a portion of the bicycle rim with a modified reinforcement member illustrated in cross-section and the spoke illustrated in elevation in accordance with a third embodiment of the present invention.

Referring now to FIG. 25, a portion of the rim 24 is illustrated with a reinforcement member 248 and a spoke 22 in accordance with a third embodiment of the present invention. The reinforcement member 248 is substantially identical to the reinforcement member 48 of the first embodiment, except that the lower abutment section 86a of the abutment surface 86 of the first embodiment has been eliminated in this third embodiment. Accordingly, in this embodiment, the second transverse dimension is substantially equal to the second maximum width of the second portion 282, and is smaller than the maximum width D of the first embodiment. Basically, reinforcement washer 248 has a first (smaller) substantially circular stepped portion 280, a second elongated (larger) stepped portion 282 and a centrally located spoke hole 284. In this embodiment, the first stepped portion 280 is identical to the first stepped portion 80 of the first embodiment. Also, the spoke hole 284 is identical to the spoke hole 84 of the first embodiment. Therefore, the first stepped portion 280 and the spoke hole 284 will not be discussed or illustrated in detail herein.

Fourth Embodiment

Figure 26:
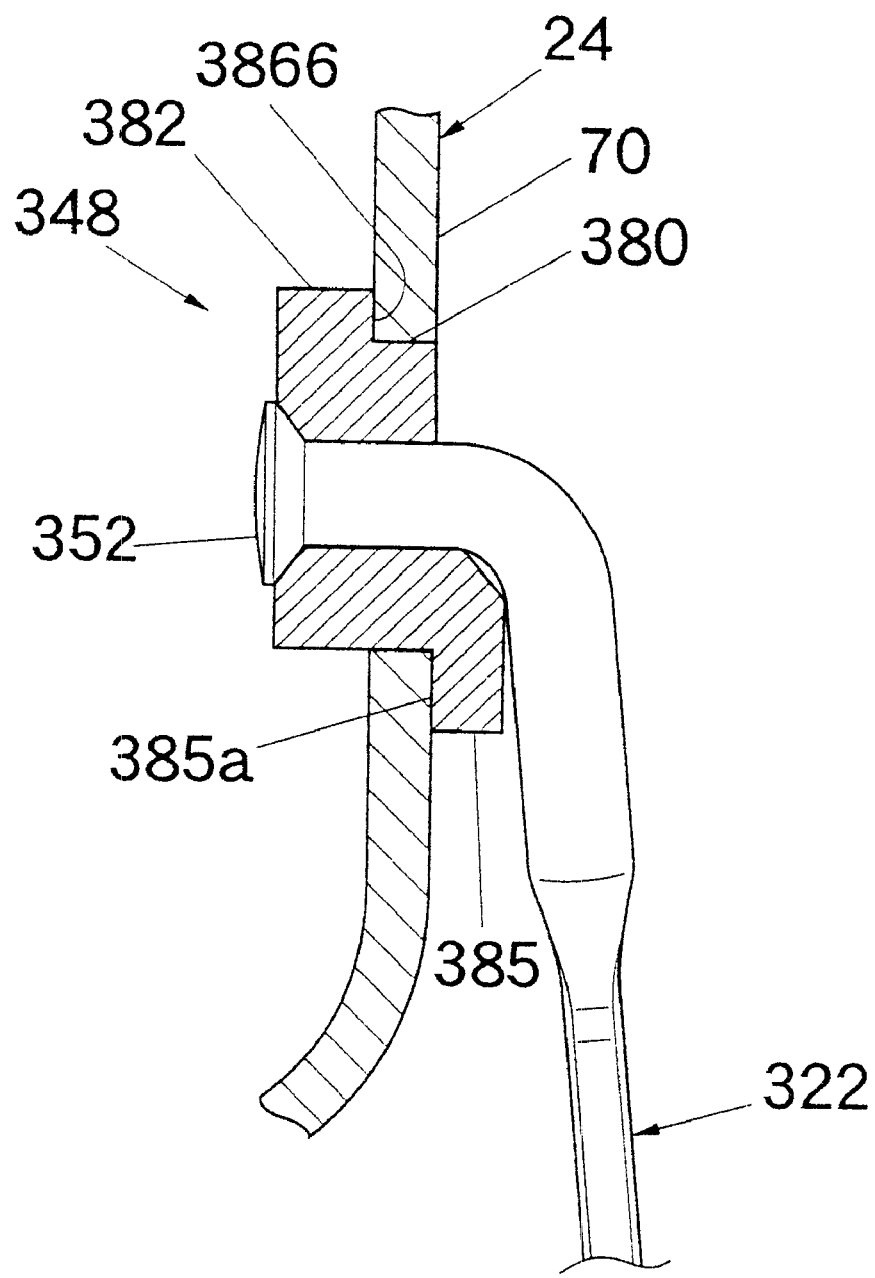
FIG. 26 is a partial, cross-sectional view of a portion of the bicycle rim with a modified reinforcement member shown in cross-section and the spoke shown in elevation in accordance with a fourth embodiment of the present invention.

Referring now to FIG. 26, a portion of the rim 24 is illustrated with a reinforcement member 348 and a spoke 322 in accordance with a fourth embodiment of the present invention. This embodiment is a modified version of the third embodiment. Specifically, spoke 322 is identical to spoke 22 except spoke head 352 is transversely offset a further distance than spoke head 52 of spoke 22 to accommodate reinforcement member 348. Accordingly, spoke 322 will not be discussed or illustrated in detail herein. More specifically, reinforcement member 348 is substantially identical to reinforcement member 248, except that reinforcement member 348 includes a third stepped portion 385 that extends radially outwardly from the bottom edge of the first stepped portion 380. This third portion 385 forms an additional abutment surface 385a that faces in a substantially opposite axial direction relative to the abutment surface 386b formed between the first and second stepped portions 380 and 382. This additional abutment surface 385a contacts the exterior surface of the spoke attachment portion 70 of the rim 24. Thus, the abutment surfaces 386b and 385a cooperate together to securely hold the reinforcement member 348 within the rim 24. Preferably, third portion 385 extends radially inwardly when reinforcement member 348 is installed in rim 24.

Fifth Embodiment

Figure 27:
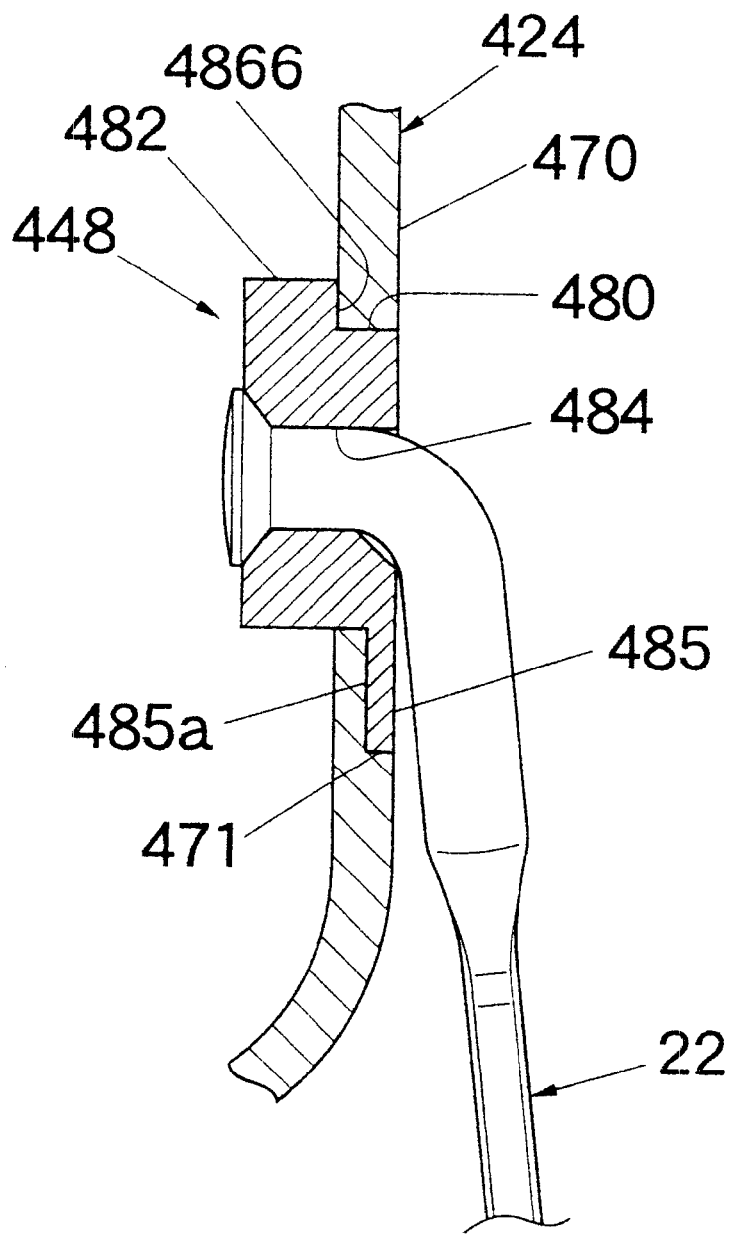
FIG. 27 is a partial, cross-sectional view of a portion of the bicycle rim with a modified reinforcement member illustrated in cross-section and a spoke illustrated in elevation in accordance with a fifth embodiment of the present invention.

Referring now to FIG. 27, a portion of a modified rim 424 is illustrated with a reinforcement member 448 and a spoke 22 in accordance with a fifth embodiment of the present invention. The reinforcement member 448 is a further modified version of the reinforcement member 348 of the fourth embodiment, discussed above. In view of the similarities between the reinforcement member 448 and the prior reinforcement members, reinforcement member 448 will not be discussed or illustrated in detail herein. Rather, the following description of the reinforcement member 448 will focus on the differences between the reinforcement member 448 and the prior reinforcement members.

The reinforcement member 448 has a first (smaller) substantially circular stepped portion 480, a second elongated (larger) stepped portion 482, a centrally located spoke hole 484 extending through the first and second stepped portions 480 and 482, and a third portion 485 extending radially outwardly from the first stepped portion 480. In this embodiment, the third portion 485 is located in a recess 471 formed in the exterior surface of the spoke attachment portion 470. This third portion 485 is designed to be flushly mounted with the exterior surface of the spoke attachment portion 470 of the rim 424. The rim 424 is substantially identical to rim 24 of the first embodiment except rim 424 has recesses 471 adjacent the spoke openings. More specifically, the third portion 485 extends radially outwardly from the first portion 480 so that its outer surface is flush with the axial end of the first stepped portion 480 and the exterior surface of the spoke attachment portion 470 of the rim 424. The third portion 485 forms an additional abutment surface 485a between the third portion 485 and the first stepped portion 480. This additional abutment surface 485a faces in a substantially opposite axial direction from the abutment surface 486b formed between the first and second stepped portions 480 and 482. Preferably, third portion 485 extends radially inwardly when reinforcement member 448 is installed in rim 424.

Clincher Style Rim

Figure 28:
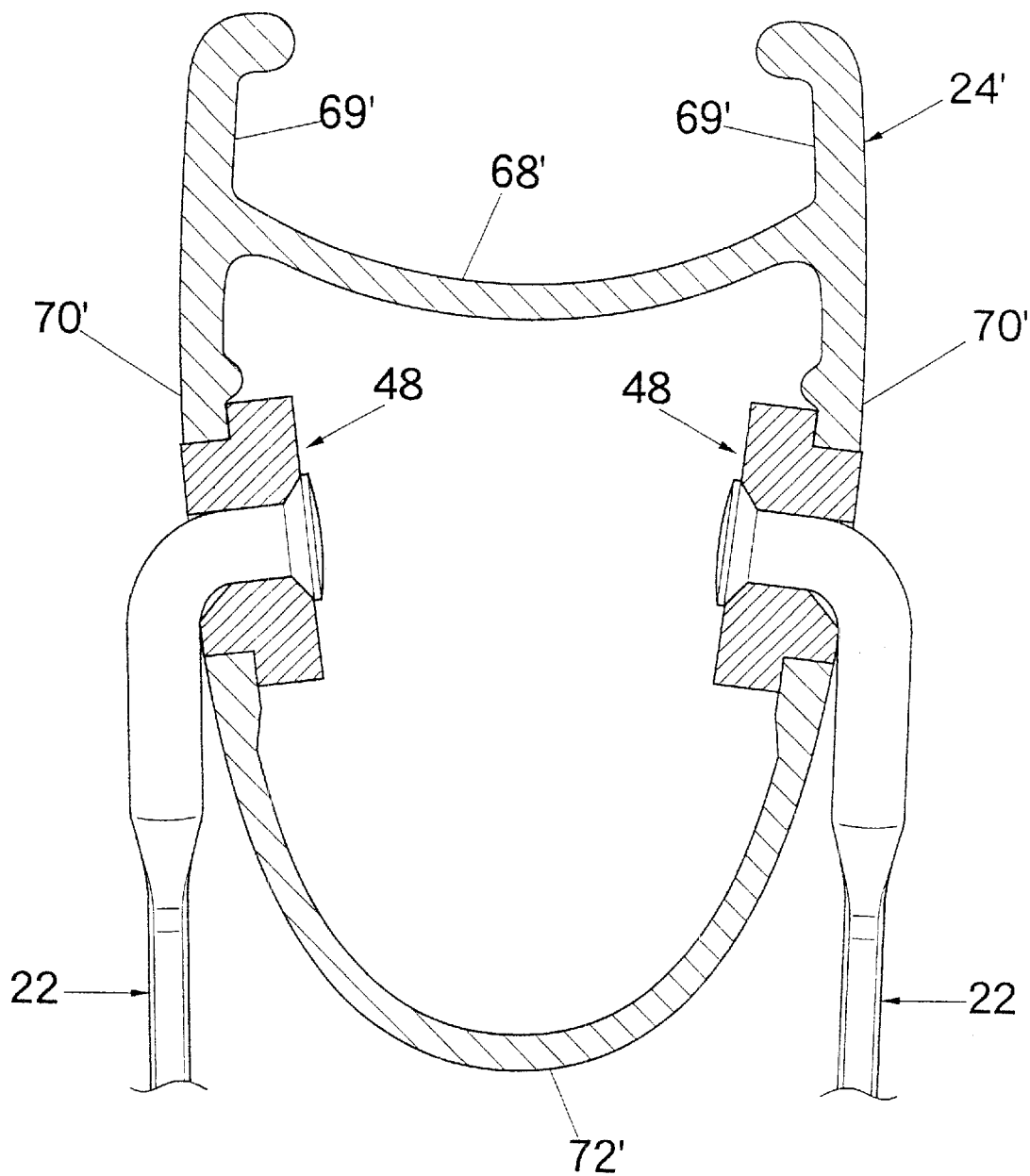
FIG. 28 is a partial cross-sectional view of a modified clincher style bicycle rim with a pair of reinforcement members shown in cross-section and a pair of spokes shown in elevation in accordance with the present invention.

Referring now to FIG. 28, a portion of a clincher rim 24' is illustrated in cross-section with a pair of reinforcement members 48 and spokes 22 coupled thereto in accordance with the present invention. The clincher rim 24' is substantially identical to the rim 24 discussed above, except that rim 24' has a pair of upwardly extending annular clincher flanges 69 for securing a clincher tire thereto. Additionally, clincher rim 24' has a slightly modified cross-sectional shape. However, other than the clincher flanges 69, the clincher rim 24' is substantially identical to the rim 24 discussed above and is designed to be used with the reinforcement members 48 and the spokes 22, as discussed above. Therefore, rim 24' will not be discussed or illustrated in detail herein. This rim 24' is especially utilized for a tubeless tire. Specifically, rim 24' basically has an outer annular portion 68', a pair of annular spoke attachment portions 70' and an inner annular portion 72'. The outer annular portion 68' is free of any openings, except for an aperture that is designed to receive a conventional valve.

Alternate Spokes/Reinforcement Members

Figure 29:
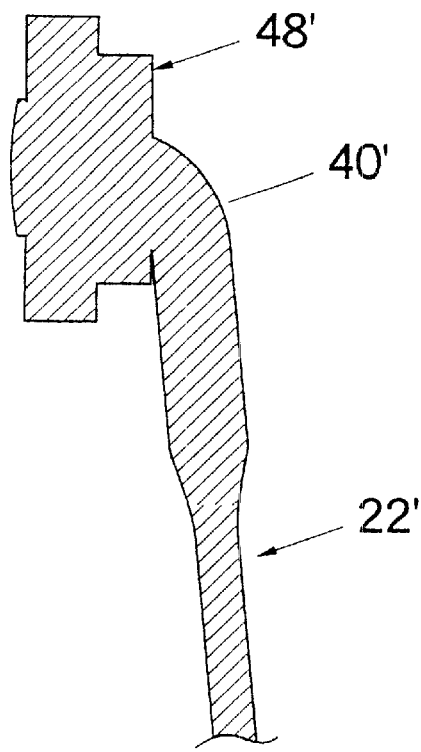
FIG. 29 is an enlarged, partial cross-sectional view of an alternate spoke with reinforcement member integrally formed therewith in accordance with the present invention.
Figure 30:
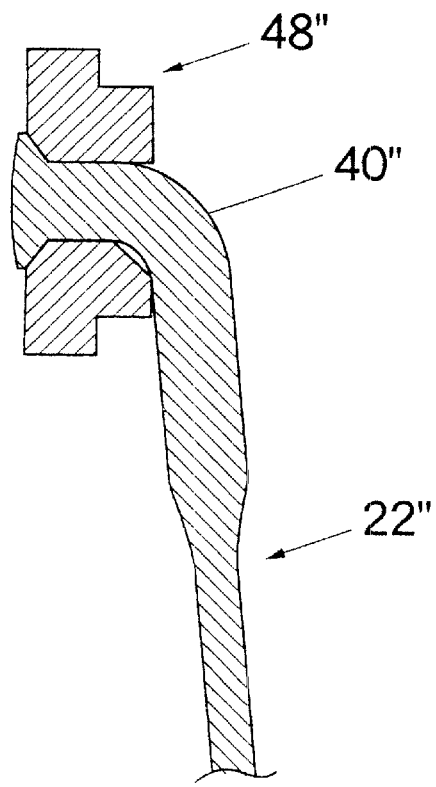
FIG. 30 is an enlarged, partial cross-sectional view of an alternate spoke with reinforcement member die-cast onto the outer portion of the spoke in accordance with the present invention.

Referring now to FIGS. 29 and 30, outer end portions 40' and 40" of spokes 22' and 22" are illustrated with reinforcement members 48' and 48" permanently secured to the outer end portions 40' and 40", respectively, in accordance with the present invention. In FIG. 29, the reinforcement member 48' is integrally formed with the spoke 22', so as to form a one-piece, unitary member constructed from a single piece of material. In FIG. 30, the reinforcement member 48" is die-casted onto the outer end portion 40" of the spoke 22". Basically, the reinforcement members 48' and 48" and spokes 22' and 22" are substantially identical to reinforcement member 48 and spoke 22 of the first embodiment discussed above except the spoke opening in the reinforcement members 48' has been eliminated in FIG. 29, and the spoke opening in the reinforcement washer 48" has the same shape as the outer portion 40" of spoke 22" (FIG. 30), and reinforcement members 48' and 48" permanently secured to the outer end portions 40' and 40", respectively. In other words, FIGS. 29 and 30 illustrate two ways of creating spokes with reinforcement members permanently secured thereto.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle component assembly for a bicycle, comprising:

an annular rim having a hollow interior formed by an outer annular portion adapted to receive a tire thereon, first and second annular spoke attachment portions extending from said outer annular portion and located radially inwardly of said outer annular portion and an inner annular portion located radially inwardly of said first and second annular spoke attachment portions and extending between said first and second annular spoke attachment portions, said first and second annular spoke attachment portions face in substantially opposite directions with a plurality of circumferentially arranged spoke openings formed therein;

a plurality of inwardly extending spokes with each of said spokes having an outer end portion at least partially received within one of said spoke openings, a center portion located radially inwardly of said outer end portion, and an inner end portion located radially inwardly of said center portion; and a plurality of reinforcement members with each of said reinforcement members being at least partially located in said spoke openings and coupled to one of said outer portions of said spokes, said reinforcement members having first and second transverse dimensions that are so dimensioned relative to said spoke openings such that said reinforcement members with said outer portions of said spokes coupled thereto pass through said spoke openings in a first relative orientation between said reinforcement members and said spoke openings, and is retained within said spoke openings in a second relative orientation between said reinforcement members and said spoke openings.

2. The bicycle component assembly according to claim 1, wherein each of said reinforcement members has a first portion with a first maximum width and a second portion with a second maximum width that forms an abutment surface between said first and second portions, said first portions being located within said spoke openings of said annular rim and said abutment surface contacting said interior of said annular rim.

3. The bicycle component assembly according to claim 2, wherein each of said second transverse dimensions is substantially equal to each of said second maximum widths of said reinforcement members.

4. The bicycle component assembly according to claim 3, wherein each of said reinforcement members includes a pair of curved side surfaces, said first transverse dimension being measured between said curved side surfaces.

5. The bicycle component assembly according to claim 2, wherein each of said second transverse dimensions is larger than each of said second maximum widths of said reinforcement members to form an additional abutment surface facing in an opposite direction of said abutment surface between said first and second portions.

6. The bicycle component assembly according to claim 5, wherein each of said reinforcement members includes a pair of curved side surfaces, said first transverse dimension being measured between said curved side surfaces.

7. The bicycle component assembly according to claim 2, wherein each of said first portions has a substantially cylindrical outer peripheral surface and each of said spoke openings has a corresponding substantially cylindrical inner periphery.

8. The bicycle component assembly according to claim 2, wherein each of said abutment surfaces of each of said reinforcement members is formed by two abutment sections located on opposite sides of said first portion.

9. The bicycle component assembly according to claim 2, wherein each of said reinforcement member includes a third portion extending from said first portion to form an additional abutment surface between said first portion and said third portion, each of said additional abutment surfaces facing in an opposite direction to said abutment surfaces between said first and second portions.

10. The bicycle component assembly according to claim 9, wherein each of said first portions has an axial thickness substantially corresponding to an axial thickness of said rim and each of said additional abutment surfaces contacts an external surface of said rim adjacent one of said spoke openings.

11. The bicycle component assembly according to claim 10, wherein each of said third portions is at least partially received a recess of said rim with said additional abutment surfaces contacting said recesses of said rim.

12. The bicycle component assembly according to claim 1, wherein each of said reinforcement members has a spoke hole extending therethrough with one of said spokes received therein.

13. The bicycle component assembly according to claim 12, wherein each of said spoke holes of said reinforcement members is non-circular in transverse cross section.

14. The bicycle component assembly according to claim 12, wherein each of said reinforcement members has a radially extending notch adjacent said spoke holes with one of said spokes at least partially located therein.

15. The bicycle component assembly according to claim 1, wherein each of said reinforcement members includes a pair of curved side surfaces, said first transverse dimension being measured between said curved side surfaces such that said reinforcement members with said outer portions of said spokes coupled thereto pass through said spoke openings in said first relative orientation.

16. The bicycle component assembly according to claim 15, wherein said curved side surfaces of each reinforcement member lie on an imaginary circle that is no greater than said spoke openings.

17. The bicycle component assembly according to claim 16, wherein said curved side surfaces extend between a pair of axial faces of said reinforcement members to form a pair of first edges and a pair of second edges.

18. The bicycle component assembly according to claim 17, wherein said first and second edges are substantially parallel.

19. The bicycle component assembly according to claim 1, wherein said outer annular portion of said rim is free of openings except a single aperture adapted to receive part of a valve therein.

20. The bicycle component assembly according to claim 1, wherein said reinforcement members are integrally formed as one-piece, unitary members with said outer end portions of said spokes.

21. The bicycle component assembly according to claim 1, wherein said reinforcement members are die cast onto said outer end portions of said spokes.

22. The bicycle component assembly according to claim 1, wherein said outer annular portion is substantially U-shaped with a pair of clincher flanges dimensioned to secure a clincher-type tire thereto.

23. The bicycle component assembly according to claim 1, further comprising:

a hub coupled to said inner end portions of said spokes.

24. A reinforcement member adapted to be positioned between a spoke and a rim with an outer annular portion, first and second annular spoke attachment portions extending from said outer annular portion and located radially inwardly of said outer annular portion and an inner annular portion located radially inwardly of said first and second annular spoke attachment portions and extending between said first and second annular spoke attachment portions, said reinforcement member comprising:

a first portion with a first maximum width that is adapted to be received in a spoke opening of the rim;

a second portion with a second maximum width that forms an abutment surface between said first and second portions; and a spoke hole extending through said first and second portions, said spoke hole being sized to receive a portion of the spoke therein, said first and second portions having a transverse dimension that is so dimensioned relative to the spoke opening such that said reinforcement member with the portion of the spoke coupled thereto passes through the spoke opening in a first relative orientation between said reinforcement member and the spoke opening, and is retained within the spoke opening in a second relative orientation between said reinforcement member and the spoke opening by said abutment surface.

25. A reinforcement member according to claim 24, wherein said second portion includes a pair of end surfaces, said maximum width of said second portion being measured between said end surfaces.

26. A reinforcement member according to claim 25, wherein said reinforcement member includes a pair of side surfaces extending between said end surfaces, said transverse dimension being measured between said side surfaces.

27. A reinforcement member according to claim 26, wherein said side surfaces are convex curved side surfaces extending from an axial face of said second portion to an axial face of said first portion to form at least a pair of first edges and a pair of second edges.

28. A reinforcement member according to claim 27, wherein said first and second edges are substantially parallel.

29. A reinforcement member according to claim 27, wherein said curved side surfaces lie on an imaginary circle.

30. A reinforcement member according to claim 24, wherein said first portion has a substantially cylindrical outer peripheral surface.

31. A reinforcement member according to claim 24, wherein said abutment surface is formed by two abutment sections located on opposite ides of said first portion.

32. A reinforcement member according to claim 24, wherein said spoke hole of said reinforcement member is non-circular in transverse cross section.

33. A reinforcement member according to claim 24, wherein said reinforcement member includes a third portion extending from said first portion to form an additional abutment surface between said first portion and said third portion, said additional abutment surface facing in an opposite direction to said abutment surface between said first and second portions.

34. A bicycle spoke, comprising:

a rim attachment end adapted to be removably received within a spoke opening of a rim;

an elongated center portion extending from said rim attachment end;

a hub attachment end extending from said center portion; and a reinforcement member located on said rim attachment end such that said reinforcement member is offset from a longitudinal axis of said center portion, said reinforcement member including a first portion with a first maximum width that is adapted to be received in the spoke opening of the rim;

a second portion with a second maximum width that forms an abutment surface between said first and second portions; and said first and second portions having a transverse dimension that is so dimensioned relative to the spoke opening such that said reinforcement member with an outer portion of the spoke coupled thereto passes through the spoke opening in a first relative orientation between said reinforcement member and the spoke opening, and is retained within the spoke opening in a second relative orientation between said reinforcement member and said spoke opening by said abutment surface.

35. A bicycle spoke according to claim 34, wherein said first and second portions have a spoke hole extending therethrough to receive a spoke therein.

36. A bicycle spoke according to claim 34, wherein said reinforcement member is integrally formed as a one-piece, unitary member with said rim attachment end.

37. A bicycle spoke according to claim 34, wherein said reinforcement member is die cast onto said rim attachment end.

38. A bicycle component assembly for a bicycle, comprising:

an annular rim having a hollow interior formed by an outer annular portion adapted to receive a tire thereon, an inner annular portion extending from said outer annular portion and located radially inwardly of said outer annular portion, said inner annular portion having a plurality of circumferentially arranged spoke openings formed therein;

a plurality of inwardly extending spokes with each of said spokes having an outer end portion at least partially received within one of said spoke openings, a center portion located radially inwardly of said outer end portion, and an inner end portion located radially inwardly of said center portion; and a plurality of reinforcement members with each of said reinforcement members having a first portion at least partially located in one of said spoke openings and coupled to one of said outer portions of said spokes, said reinforcement members having first and second transverse dimensions that are so dimensioned relative to said spoke openings such that said reinforcement members with said outer portions of said spokes coupled thereto pass through said spoke openings in a first relative orientation between said reinforcement members and said spoke openings, and are retained within said spoke openings in a second relative orientation between said reinforcement members and said spoke openings, each of said spoke openings having a tubular inner peripheral surface and each of said first portions having a corresponding outer peripheral surface substantially parallel to said inner peripheral surface in said second relative orientation such that said first portions of said reinforcement members mate with said spoke openings when said first portions are located within said spoke openings in said second relative orientation.

39. The bicycle component assembly according to claim 38, wherein said first portion of each of said reinforcement members has a first maximum width and each of said reinforcement members includes a second portion with a second maximum width that forms an abutment surface between said first and second portions, said abutment surface contacting said interior of said annular rim when said first portions are located within said spoke openings in said second relative orientation.

40. The bicycle component assembly according to claim 38, wherein each of said second transverse dimensions is substantially equal to each of said second maximum widths of said reinforcement members.

41. The bicycle component assembly according to claim 40, wherein each of said reinforcement members includes a pair of curved side surfaces, said first transverse dimension being measured between said curved side surfaces.

42. The bicycle component assembly according to claim 38, wherein each of said reinforcement members has a spoke hole extending therethrough with one of said spokes received therein.

43. The bicycle component assembly according to claim 38, wherein said outer annular portion of said rim is free of openings except a single aperture adapted to receive part of a valve therein.

44. The bicycle component assembly according to claim 38, further comprising:

a hub coupled to said inner end portions of said spokes.

45. A bicycle component assembly for a bicycle, comprising:

an annular rim having a hollow interior formed by an outer annular portion adapted to receive a tire thereon, an inner annular portion extending from said outer annular portion and located radially inwardly of said outer annular portion, said inner annular portion having a plurality of circumferentially arranged spoke openings formed therein;

a plurality of inwardly extending spokes with each of said spokes having an outer end portion at least partially received within one of said spoke openings, a center portion located radially inwardly of said outer end portion, and an inner end portion located radially inwardly of said center portion; and a plurality of reinforcement members with each of said reinforcement members having a first portion at least partially located in said spoke openings and coupled to one of said outer portions of said spokes, said reinforcement members having first and second transverse dimensions that are so dimensioned relative to said spoke openings such that said reinforcement members with said outer portions of said spokes coupled thereto pass through said spoke openings in a first relative orientation between said reinforcement members and said spoke openings, and are retained within said spoke openings in a second relative orientation between said reinforcement members and said spoke openings, each of said first portions having a substantially cylindrical outer peripheral surface and each of said spoke openings has a corresponding substantially cylindrical inner periphery.

* * * * *